United States Patent
Lin et al.

(10) Patent No.: US 11,869,172 B2
(45) Date of Patent: *Jan. 9, 2024

(54) KERNEL RESHAPING-POWERED SPLATTING-BASED EFFICIENT IMAGE SPACE LENS BLUR

(71) Applicant: Adobe Inc., San Jose, CA (US)

(72) Inventors: Haiting Lin, Santa Clara, CA (US); Yumin Jia, Sunnyvale, CA (US); Jen-Chan Chien, Saratoga, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,161

(22) Filed: Nov. 14, 2022

(65) Prior Publication Data

US 2023/0075050 A1 Mar. 9, 2023

Related U.S. Application Data

(63) Continuation of application No. 16/950,320, filed on Nov. 17, 2020, now Pat. No. 11,501,413.

(51) Int. Cl.
*G06T 5/00* (2006.01)
*G06T 5/20* (2006.01)
*G06T 7/90* (2017.01)
*G06T 7/50* (2017.01)

(52) U.S. Cl.
CPC ............... *G06T 5/002* (2013.01); *G06T 5/20* (2013.01); *G06T 7/50* (2017.01); *G06T 7/90* (2017.01)

(58) Field of Classification Search
CPC .. G06T 5/002; G06T 5/20; G06T 7/50; G06T 7/90; G06T 5/50; G06T 2207/10024; G06T 2207/10028; G06T 5/00; G06T 15/00; G06F 3/0484; H04N 5/357; H04N 5/3572; H04N 13/128; H04N 21/4318; G02C 7/02

See application file for complete search history.

(56) References Cited

U.S. PATENT DOCUMENTS

| 8,149,235 | B2 * | 4/2012 | Aguera y Arcas ... G06T 3/4007 345/422 |
| 9,202,258 | B2 * | 12/2015 | Greisen ................. G06T 3/0012 |
| 10,664,953 | B1 | 5/2020 | Lanman et al. |

(Continued)

FOREIGN PATENT DOCUMENTS

EP 2072004 A1 6/2009

OTHER PUBLICATIONS

Notice of Allowance, U.S. Appl. No. 16/950,320, dated Jul. 18, 2022, 12 pages.

*Primary Examiner* — Jose L Couso
(74) *Attorney, Agent, or Firm* — Nicholson De Vos Webster & Elliott LLP

(57) ABSTRACT

Embodiments are disclosed for generating lens blur effects. The disclosed systems and methods comprise receiving a request to apply a lens blur effect to an image, the request identifying an input image and a first disparity map, generating a plurality of disparity maps and a plurality of distance maps based on the first disparity map, splatting influences of pixels of the input image using a plurality of reshaped kernel gradients, gathering aggregations of the splatted influences, and determining a lens blur for a first pixel of the input image in an output image based on the gathered aggregations of the splatted influences.

20 Claims, 13 Drawing Sheets

(56) References Cited

U.S. PATENT DOCUMENTS

| | | | |
|---|---|---|---|
| 2004/0012603 A1* | 1/2004 | Pfister | G06T 15/08 |
| | | | 345/582 |
| 2006/0038823 A1* | 2/2006 | Arcas | G06T 3/4007 |
| | | | 345/587 |
| 2007/0216707 A1* | 9/2007 | Lee | G06T 5/003 |
| | | | 345/611 |
| 2014/0104380 A1* | 4/2014 | Greisen | H04N 13/106 |
| | | | 348/42 |
| 2015/0178970 A1 | 6/2015 | Pham | |
| 2021/0065434 A1* | 3/2021 | Öztireli | G06T 7/90 |
| 2021/0192760 A1* | 6/2021 | Riemens | G06T 7/50 |
| 2022/0076382 A1 | 3/2022 | Hillman | |
| 2022/0076437 A1 | 3/2022 | Hillman | |

* cited by examiner

KERNEL RESHAPING-POWERED SPLATTING-BASED EFFICIENT IMAGE SPACE LENS BLUR

CROSS-REFERENCE TO RELATED APPLICATION

This application is a continuation of U.S. patent application Ser. No. 16/950,320, filed on Nov. 17, 2020, which is expressly incorporated by reference herein in its entirety.

BACKGROUND

Technical Field

The present disclosure relates generally to systems and method for image enhancement. More specifically, one or more embodiments of the present disclosure relate to systems and methods that add image blur effects to images.

Background and Relevant Art

Recent years have seen a rapid proliferation in the use of digital media, such as digital photography and computer-generated imagery. The use of digital media enables a user to edit or otherwise customize a digital image for a particular purpose. This includes applying various post-processing effects digital images such as smoothing, sharpening, blurring, and deblurring. One such effect, lens blurring, attempts to emulate the visual effect of the out-of-focus parts of an image produced by a lens. However, applying a realistic and visually pleasing lens blur effect to a digital image based on limited data associated with the digital image is challenging and computationally intensive. As a result, typical implementations produce a number of visual artifacts which detract from the realism of the lens blur effect.

These and other problems exist with regard to adding lens blur effects in digital visual media.

BRIEF SUMMARY

Introduced here are techniques/technologies that apply lens blur effects to input images. In particular, in one or more embodiments, the disclosed systems and methods apply the blur effect in gradient domain rather than image domain to reduce complexity. A request to add lens blur includes image data (e.g., an input all-in-focus image and corresponding disparity map) on which to apply the lens blur effect. The disparity map is used to precompute a plurality of refined disparity maps that are used during blur computation. For example, a disparity edge map is generated from the disparity map and one or more distance to edge maps are generated from the disparity edge map. These maps enable efficient blur kernel reshaping, for example, to exclude any blocking objects. By reshaping the blur kernel to exclude blocking objects, color bleed artifacts are eliminated from the resulting blur effect. Kernel reshaping is further applied to strategically manipulate pixel influence which leads to a per pixel linear equation system for lens blur effect based on an alpha blending model. Additionally, blur kernels are precomputed based on lens blur settings (e.g., aperture shape, orientation, etc.). The size of a blur kernel varies depending on the disparity of the target point to which the blur kernel is being applied. For example, points closer to the focal plane are associated with a smaller blur kernel while points farther from the focal plane are associated with a larger blur kernel.

More specifically, in one or more embodiments, the systems and methods reshape blur kernels during blur computation using the disparity maps and distance maps that have been precomputed. The reshaped blur kernel is used to perform splatting-based lens blur, which includes both color splatting and count splatting. This processing combines splatting that excludes occluded content and that restrains pixel influence inside object boundaries to add blur while reducing color bleeding and hard transition artifacts. Additionally, a highlight map which includes weights indicating a relative intensity of pixels, is used to simulate bokeh highlighting.

Additional features and advantages of exemplary embodiments of the present disclosure are set forth in the description which follows, and in part are obvious from the description, or are learned by the practice of such exemplary embodiments.

BRIEF DESCRIPTION OF THE DRAWINGS

The detailed description is described with reference to the accompanying drawings in which.

DETAILED DESCRIPTION

Figure 1:
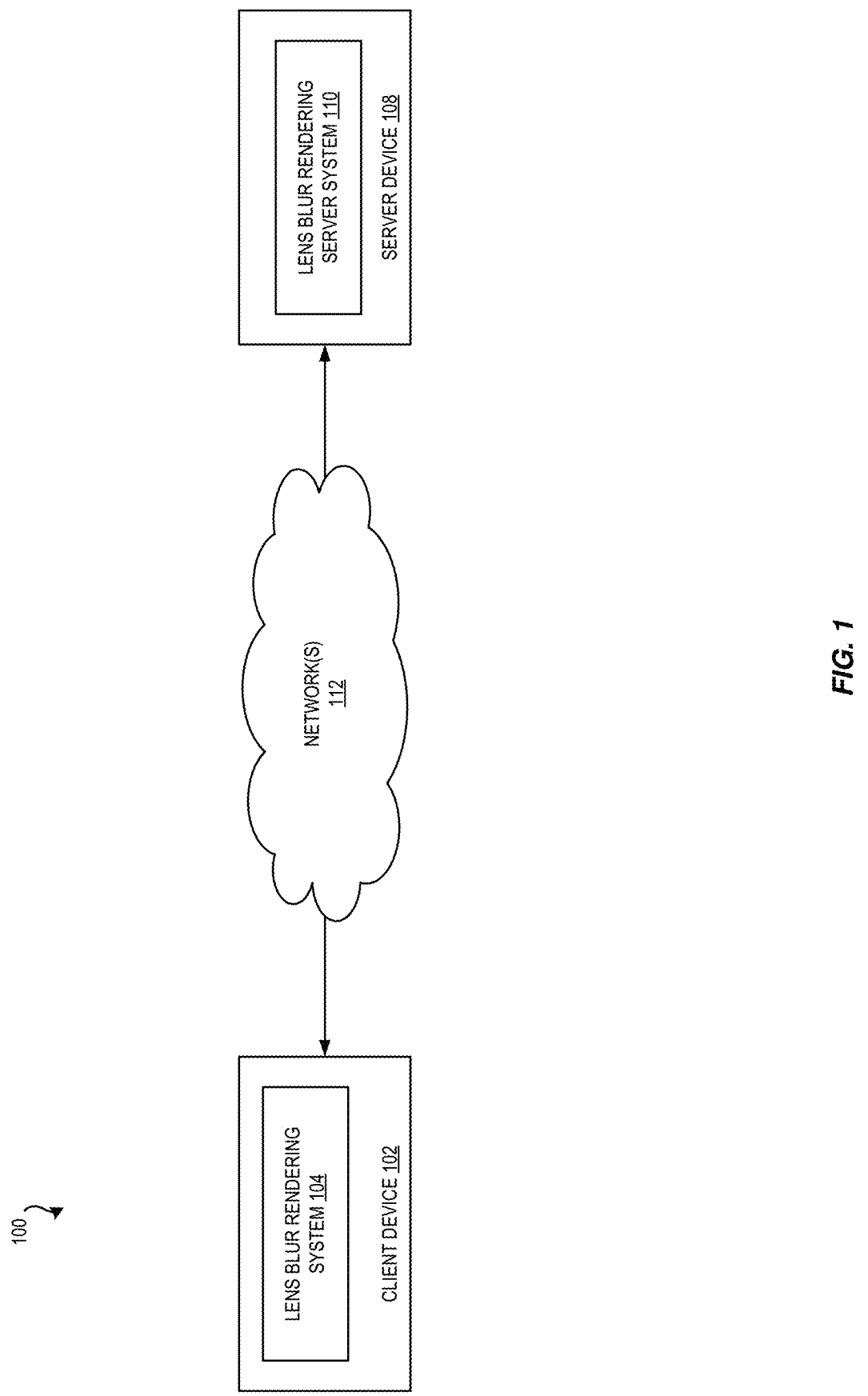
FIG. 1 illustrates an example environment in which lens blur rendering is performed in accordance with one or more embodiments.

A lens blur effect is applied to an all-in-focus image to make the image appear as though it were taken with a large aperture camera (e.g., to simulate a shallow depth of field). This results in some regions of the image being blurred and some regions remaining in focus, depending on the chosen focal depth. Such lens blur effects often result in a number of visual artifacts, such as color bleeding and hard transitions around blurred object boundaries, resulting in an unrealistic appearance. Traditional lens blur systems have used a variety of ray handling techniques to attempt to correct for these artifacts. For example, some systems perform direct kernel convolution on each depth layer from farthest to nearest. This addresses color bleeding, as the closer layers overwrite the farther layers, but still results in hard transitions around now-blurred objects. Additionally, the complexity of such algorithms is increased by the number of depth layers to be processed.

Other traditional lens blur systems employ gathering-based kernel convolution techniques, which require iteratively sampling kernel pixels to identify those that should contribute to a given output pixel. Although gathering schemes enable more controllability over ray selection and sampling to reduce artifacts, this comes at the cost of significant computational complexity which limits real-time applications to relatively small blur kernels. These techniques also introduce their own artifacts, such as over-smoothing. Further, prior techniques use blur kernels that assume a scaled version of the aperture shape. This does not accurately model the ray cone of a 3D scene point, which may be partially or completely occluded before reaching the camera, and also leads to unrealistic results.

One or more embodiments of the present disclosure include a lens blur rendering system that adds lens blur effects to input all-in-focus images based on their corresponding disparity maps. To address the deficiencies of prior techniques, embodiments perform splatting in the gradient domain using reshaped kernel gradients. By taking the gradient of the blur kernel, and performing splatting in the gradient domain, the computational complexity is reduced which enables real-time applications to use larger blur kernels. Reshaping the kernel gradients enables the influences of each pixel to be more precisely controlled. In some embodiments, the lens blur rendering system receives an input image to which the blur effect is to be added, and a corresponding disparity map. In some embodiments, the disparity map indicates, for each pixel in the image, a distance for that pixel from a reference viewpoint (e.g., the camera) or a relative distance (e.g., disparity) of a pixel compared to other pixels. In addition to the image and corresponding disparity map, the user specifies lens blur parameters, such as a distance of interest, corresponding to a depth value, or range of depth values, or a disparity surface defined on the 2D spatial locations of the input image (e.g. a tilted disparity plane), of the portion or portions of the image which are to be in focus and an aperture shape.

Using the image, corresponding disparity map, and lens blur parameters embodiments precompute a plurality of refined disparity maps to be used during processing. The refined disparity maps are calculated independently of the aperture shape and the desired focal depth/disparity and therefore are reusable even if the lens blur parameters are changed by the user. Additionally, precomputed kernel gradients of varying sizes and shapes are made available for lens blur processing. The precomputed gradients correspond to the aperture shapes available for lens blur simulation (e.g., circular, multi-bladed, etc.) and are precomputed at different sizes such that the appropriately sized kernel gradient for a particular target point is available. In some embodiments, the shape of the aperture also varies spatially, such as in cat's eye effect.

Using the precomputed kernel gradients and refined disparity maps, the influences of each pixel in the input image are splatted. In particular, the kernel gradients are reshaped to correct for the artifacts described above. For example, to avoid color bleeding, the kernel gradient is reshaped around occluding objects to exclude blocked rays. This prevents the influence of a partially occluded pixel to bleed through the occluding object. The kernel gradients are also reshaped to restrain the pixel influence inside object boundaries, preventing color bleed from foreground objects into background objects. Once the influence of each pixel of the input image has been splatted in the gradient domain, the influences are gathered by integrating over the splatted influences. This results in a per pixel linear equation system based on an alpha blending model to solve for the per-pixel lens blur result. Additionally, the pixels are weighted according to their relative intensity to simulate bokeh highlights.

Term Definitions

As used herein, the term "digital visual media" refers to digital data capable of producing a visual representation. For instance, the term "digital visual media" includes digital images and digital video.

As used herein, the term "digital image" or "image" refers to any digital symbol, picture, icon, or illustration. For example, the term "digital image" includes, but is not limited to, digital files with the following file extensions: JPG, TIFF, BMP, PNG, RAW, or PDF. Thus, a digital image includes digital data or a digital file for an image that is displayable via a graphical user interface of a display of a computing device.

As used herein, the term "digital video" or "video" refers to digital data representative of a sequence of visual images (e.g., frames). By way of example, the term "digital video" includes, but is not limited to, a digital file having one of the following file extensions: AVI, FLV, WMV, MOV, MP4. Thus, a digital video includes digital data or a digital file for a video that is displayable via a graphical user interface of a display of a computing device.

As used herein, the term "disparity map" refers to a digital image or a channel of a digital image that includes depth data for each pixel of a corresponding digital image. For example, the value of each pixel of a disparity map indicates a depth of that pixel from a reference viewpoint. In some embodiments, each pixel value of the disparity map indicates a relative depth of that pixel as compared to other pixels in the disparity map.

As used herein, the term "lens blur" refers to the effect of defocus on portions of a digital image. Various camera attributes contribute to a lens blur when an image is captured. For example, the camera's focal length, aperture, f-number, distance to subject, etc. all determine which portions of a given digital image are in focus and which portions are out of focus (e.g., the depth of field).

As used herein, the term "lens blur effect" refers to the application of lens blur to digital visual media be applied to digital visual media to change the depth of field of the digital visual media. For example, a digital image includes representations of objects at multiple depths. If the digital image has a deep enough depth of field, the representations of all of the objects appear in focus, whereas if the digital image has a shallower depth of field some or none of the objects appear in focus, depending on their placement relative to the camera. A lens blur effect added to a digital image adds lens blur selectively to portions of the digital image based on input parameters, such as distance of interest, which is to be in focus, aperture shape, etc.

As used herein, the term "blur kernel" refers to a matrix that adds blur to an image through image convolution. In the embodiments described herein, convolution is performed in the gradient space to reduce computational complexity. As such, the gradient of the blur kernel is used. The shape of the blur kernel is determined based on the aperture shape being used in the lens blur effect and correlates to the shape of the resulting bokeh in the lens effect.

FIG. 1 illustrates an example environment in which lens blur rendering is performed in accordance with one or more embodiments. As illustrated in FIG. 1, the environment 100 includes the client device 102 having lens blur rendering system 104. The lens blur rendering system 104 generally facilitates the creation, modification, sharing, and/or deletion of graphical content including raster-based content. In one or more embodiments, the lens blur rendering system 104 is a design application such as ADOBE® PHOTOSHOP®. In other embodiments, the lens blur rendering system 104 includes multiple applications, functions, and operations relating to graphical content, such as an application suite, a web-based application, and/or system operations on the client device 102.

In addition, the environment 100 includes the server device 108. The server device 108 generates, stores, receives, and/or transmits any type of data, including digital visual media. As shown, the server device 108 includes a lens blur rendering server system 110 that communicates with the lens blur rendering system 104 on the client device 102. For example, the lens blur rendering server system 110 transmits digital visual media to the client device 102, which enables the client device 102 to add blur effects to the digital visual media. Notably, while only a single server device is shown, in some embodiments, the lens blur rendering server system 110 is implemented across multiple server devices.

While not illustrated, in one or more embodiments, the server device 108 includes all, or a portion of, the lens blur rendering system 104, such as within the lens blur rendering server system 110. For example, when located in the server device 108, the lens blur rendering system 104 comprises an application running on the server device 108 or a portion of a software application that is downloadable to the client device 102. For instance, the lens blur rendering system 104 includes a web hosting application that allows the client device 102 to interact with content from the lens blur rendering server system 110 hosted at the server device 108. In this manner, in some embodiments, the server device 108 adds blur effects to digital visual media based on inputs received from a designer using client device 102.

Figure 2:
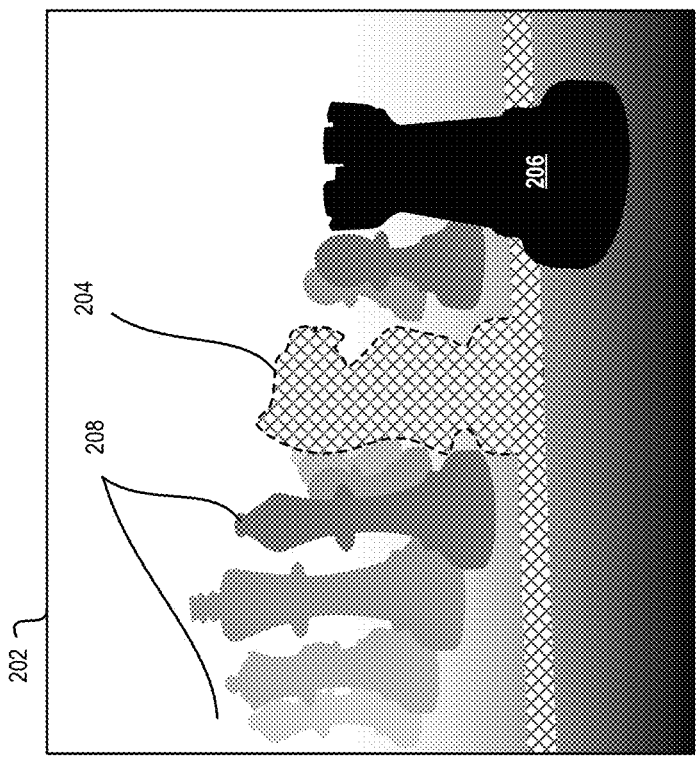
FIG. 2 illustrates an example of varying kernel size in accordance with one or more embodiments.
Figure 2:
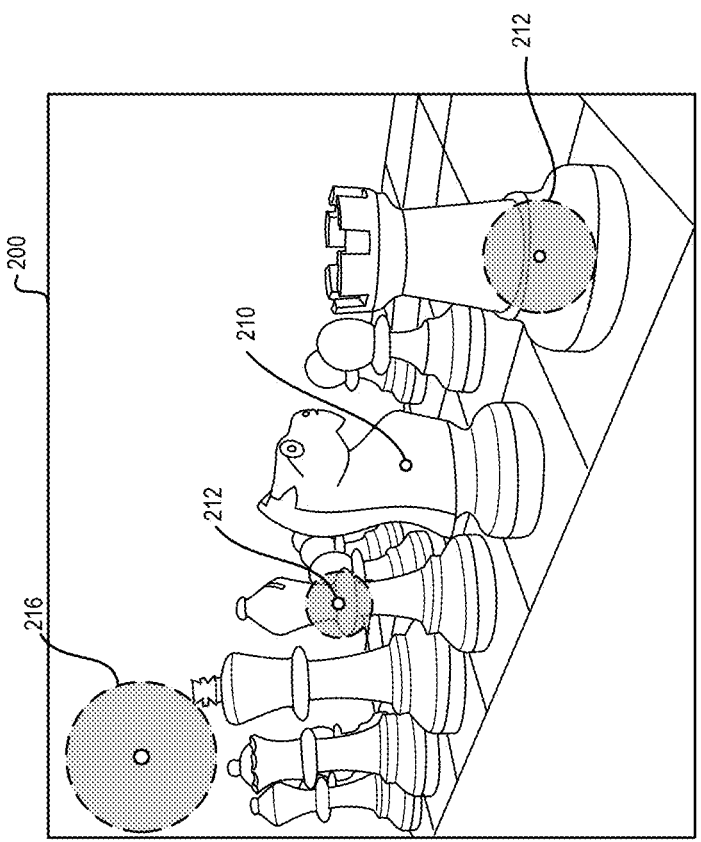

FIG. 2 illustrates an example of varying kernel size in accordance with one or more embodiments. As shown in FIG. 2, an input image 200 includes visual representations of various objects which are depicted at different depths relative to the camera's point of view. Although the input image 200 shows a digital image, the input image comprises any type of digital visual media. As discussed, the term "digital visual media" refers to digital data capable of producing a visual representation. For instance, the term "digital visual media" includes digital images and digital video. As used herein, the term "digital image" refers to any digital symbol, picture, icon, or illustration. For example, the term "digital image" includes, but is not limited to, digital files with the following file extensions: JPG, TIFF, BMP, PNG, RAW, or PDF. Accordingly, although FIG. 2 illustrates the input image 202 as a digital image, the lens blur rendering system is also capable of adding blur effects to various other types of digital visual media.

A given camera has a depth of field based on the focal length, aperture, circle of confusion and distance to subject. As shown in FIG. 2, the input image includes representations of chess pieces on a chessboard. The depth of field is a measure of the distance between objects that are in focus. In the example input image 200 of FIG. 2, the chess pieces and chessboard fall within the camera's depth of field as they are all in focus. Adding lens blur in post-processing to an input image enables a user to provide the effect of a different depth of field than that of the camera that captured the input image. This is chosen for artistic or aesthetic purposes, to focus the viewer on a particular portion of the digital image, or other purposes.

Embodiments use a disparity map 202 corresponding to the input image 200, as shown in FIG. 2, to identify which source pixels from the input image 200 contribute to an output pixel of the post-processed image which has had the lens blur effect added. In some embodiments, disparity map 202 is a channel of the input image 200 which includes depth data for each pixel of the digital image rather than color data. In some embodiments, the disparity map 202 is maintained as a separate file. The depth data in the disparity map indicates, for each pixel of the disparity map, the distance of that pixel from a reference viewpoint (e.g., the camera). For example, in the disparity map 202 of FIG. 2, darker pixels correspond to nearer objects and lighter pixels correspond to farther objects. As discussed, in some embodiments, the depth data represents the distance from a reference viewpoint (e.g., a camera) or, in alternative embodiments, the depth data represents relative depth data between the depicted objects.

In some embodiments, a disparity map is created manually by a user selecting objects in an image and assigning those objects a depth. For example, the lens blur rendering system enables the user to select one or more portions of the image that include objects having the same depth and define a depth value for those portions of the image. The user continues selecting portions of the image and assigning depth values to those portions until the disparity map for the image has been created. In some embodiments, a disparity map is generated automatically by the camera when the image is captured. For example, in some embodiments, the camera uses one or more range imaging techniques, such as time-of-flight, stereo triangulation, or other techniques. In some embodiments, range data is obtained using other sensors in communication with the camera such as range finders, light detection and ranging (LiDAR) sensors, or other sensors. In some embodiments, a disparity map is approximated by the lens blur rendering system based on the input image. For example, monocular depth cues, such as texture information or perspective, depth edge-aware algorithms, or other techniques. In some embodiments, the disparity map determines relative depth information of pixels to one another based on observed parallax from moving the camera or from an image captured simultaneously by two cameras at known positions.

Using the input image 200 and corresponding disparity map 202, the lens blur rendering system 104 implements a heuristics-based lens blur technique to add lens blur to the input image based on a user-specified distance of interest. For example, in the embodiment of FIG. 2, the distance of interest corresponds to a focal plane 204, which in this example includes a knight, a pawn, and portions of the chessboard. Although the example of FIG. 2 includes a focal plane, in various embodiments a focal surface is used to define the portions of the image which are to be in focus. A focal plane is one type of focal surface, however in some embodiments the focal surface is a 2D surface other than a plane in which any points along the focal surface are in focus. As shown in FIG. 2, the darkest portion of the disparity map, corresponding to objects in the nearest plane 206 to the camera, includes the rook and near portions of the chessboard. This is followed by the focal plane 204, and farther portions of the chessboard 208. As shown, the depth information of the pixels in the disparity map is depicted as grayscale values, with near portions of the image being darker and far portions of the image being lighter. In various embodiments, the depth information is depicted using alternative color palettes. For example, different colors represent distance from the reference viewpoint, rather than grayscale values.

In a real imaging system, points of a scene that are out of focus project to a shape on the camera sensor. This shape varies depending on the aperture of the camera capturing the image. For example, points of a scene that are out of focus will project to a disk on the sensor of a camera having a circular aperture. This disk is referred to as the circle of confusion (CoC). According to thin lens theory, the radius $c_p$ of the CoC from a scene point P is determined by $c_p = D|d_p - d_s| = D|\Delta d_p|$, where D is the aperture size, $d_p$ is the disparity of point P, $d_s$ is the disparity at focus, and $\Delta d_p$ is the relative disparity offset towards the focal plane. Disparity is related to depth z by $$d = \frac{s}{z},$$

where s is a scalar. Although embodiments are discussed with respect to a circular aperture which produces a disk shaped CoC, other embodiments use different shaped apertures. Other aperture shapes result in a correspondingly shaped blur, e.g. a six-bladed aperture generates a hexagonal blur. These resulting blur shapes are referred to as bokeh. In addition to changing the size of the projection depending on the relative disparity of the point, the intensity of the CoC also varies. Given that the same number of rays from a scene point are passing through the aperture, the intensity of a bokeh decreases as the size of CoC increases. More precisely, the intensity of a bokeh pixel is reciprocal to the area of the bokeh.

The varying radius of the blur depending on the relative disparity of the point in the scene is shown in FIG. 2. For example, points along the focal plane, such as point 210 on the knight, are in focus, and therefore project to a single point on the sensor. However, points in front of, or behind, the focal plane project to a CoC whose radius is dependent on the relative disparity of that point. For example, nearby points on the bishop project to a CoC 212, while farther away points in front of the focal plane (e.g., on the rook) project to a larger CoC 214, and similarly farther points in the background project to a larger CoC 216. As such, embodiments vary the size of the blur kernel used when simulating a blur effect depending on the relative disparity of the pixel being processed.

Based on the above, given an all-in-focus color image I and its corresponding disparity map M, each pixel in the input I scatters its influence onto the neighbor pixels of the result image R according to its bokeh, whose shape and intensity are determined by its relative disparity offset computed from M and a chosen aperture. The final result $R_p = \sum_{q \in \Omega_p} I(q) \cdot K_{\Delta d_q}(p-q)$, where $\Omega_p$ is the set of neighbor pixels influencing pixel p, and $K_{\Delta d_q}$ is the 2D blur kernel representing the bokeh at relative disparity offset $\Delta d_q$. This formulation becomes image convolution if assuming the neighboring pixels share the kernel of pixel p and is regarded as a gathering process.

The computation complexity of a direct convolution or scattering algorithm is $O(n \cdot r^2)$, where n is the number of pixels and r is the maximum radius of the blur kernel. This only allows relatively small blur kernel in real time applications. However, gradient domain scattering techniques are usable to reduce the computation complexity to $O(n \cdot r)$ for mostly flat kernels. The underlying theory states that scattering (e.g., splatting) is performable in the gradient domain as $splat(I,K) = G(\Delta(splat(I,K))) = G(splat(I,\Delta K))$, where $splat(I, K)$ denotes additive splatting of a spatially varying kernel K into image I, and G and $\Delta$ are integral and gradient operators respectively. The second equality holds due to the commutativity and distributivity of all involved operations. The splat operation is achieved by first taking the gradient of the kernel, and then applying the splat operator to the image with the gradient map, and finally performing integration on the result. With the integral and gradient operators being O(n) complexity, the reduction of computation complexity comes from the sparsity of the kernel gradient map. Using a circular flat kernel, the number of non-zero points in the y-gradient map is only around 4r. This allows relatively large blur kernels to be used for real time applications.

Figure 3:
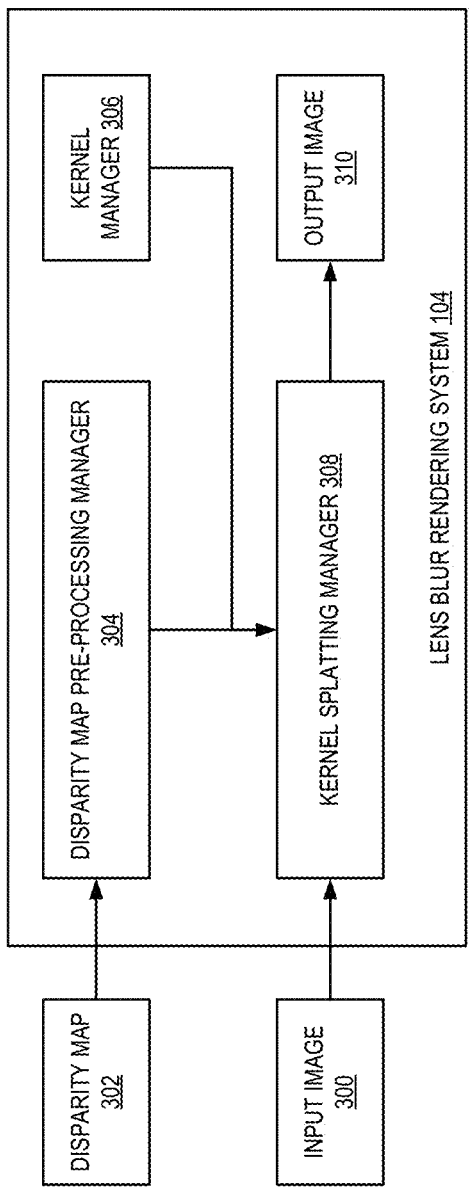
FIG. 3 illustrates a diagram of a lens blur processing pipeline in accordance with one or more embodiments.

FIG. 3 illustrates a diagram of a lens blur processing pipeline in accordance with one or more embodiments. As shown in FIG. 3, lens blur rendering system 104 receives an input image 300 and a corresponding disparity map 302. As discussed, the input image is an all-in-focus image, and the disparity map indicates the depth or relative depth of each pixel of the input image from a reference viewpoint. In some embodiments, the disparity map is a channel of the input image 300, and a single image file is input to the lens blur rendering system. Alternatively, the disparity map 302 and the input image 300 are separate files that are input to the lens blur rendering system 104.

The disparity map 302 is received by disparity map pre-processing manager 304. Disparity map pre-processing manager 304 performs pre-processing on the disparity map 302. As discussed further below, this includes generating refined disparity maps such as a disparity alpha map, a solid disparity map, a disparity edge map, a disparity gradient map, distance maps, etc. These refined disparity maps are used by kernel splatting manager 308 when processing the pixels of input image 300 to determine the lens blur result of output image 310.

Additionally, as shown in FIG. 2, a kernel manager 306 precomputes a plurality of blur kernels according to the blur settings in use for the blur effect. Additionally, the blur kernel sizes depend on the relative disparity shown in disparity map 302. Because convolution is performed in gradient space, kernel manager 306 precomputes the gradient of the kernel. For example, the kernel of a circular aperture is a disk, and the gradient of the disk is the signed edges of the disk. As discussed, the blur kernel of other aperture shapes reflects those aperture shapes (e.g., a 6-sided aperture results in a hexagonal blur kernel, etc.). The resulting set of pre-computed blur kernels is then available to the kernel splatting manager 308.

The kernel splatting manager 308 receives input image 300, the refined disparity maps from disparity map pre-processing manager 304, and blur kernels from kernel manager 306. For each pixel of the input image 300, the kernel splatting manager 308 uses the refined disparity maps to determine if and how the blur kernel for that pixel is to be reshaped. Kernel splatting manager 308 implements different kernel reshaping strategies and constructs a linear equation system according to the splatting results based on an alpha blending model. This alpha blending model treats the aggregated foreground and background influence as a single foreground and background quantities respectively and models the occluded amount as a weighting factor which is associated to the corresponding aggregated quantity. This kernel reshaping powered splatting system analyzes the complex ray interaction between scene objects and enables the final blur effect to appear more realistic. As discussed, conventional blur rendering techniques generate a number of artifacts. These are produced, in part, due to inaccurate modeling of how rays reach the sensor in a real 3D scene. One typical modeling assumes that the kernel at different spatial location always has a scaled complete shape of the aperture, in other words, all of the rays in a ray cone of a 3D scene point always reach the sensor without being occluded by other objects in the scene. However, in a real 3D scene, it is possible that a ray cone from a further point is partially or completely occluded by an intervening object between that point and the camera. This results in a kernel of altered shape. Additionally, it is possible that parts of the ray cone of a completely occluded point also reach the sensor. Lack of proper ray handing leads to artifacts, such as color bleeding and hard transition around the boundaries of blurred object.

To avoid color bleeding, the first strategy that kernel splatting manager 308 implements is to reshape the kernel for a given pixel to exclude any occluded rays due to a blocking object. As discussed further below, kernel reshaping is performed using the refined disparity maps generated by the disparity map pre-processing manager 304. Generally, three additional reshaping strategies respecting the disparity edges are also performed based on influence analysis by the kernel splatting manager 308 and an intermediate blur result is calculated by solving a per pixel linear equation system constructed from those different results corresponding to the strategies respectively. This process is performed for each pixel in input image 300 to generate output image 310 which has had the blur effect added.

Figure 4:
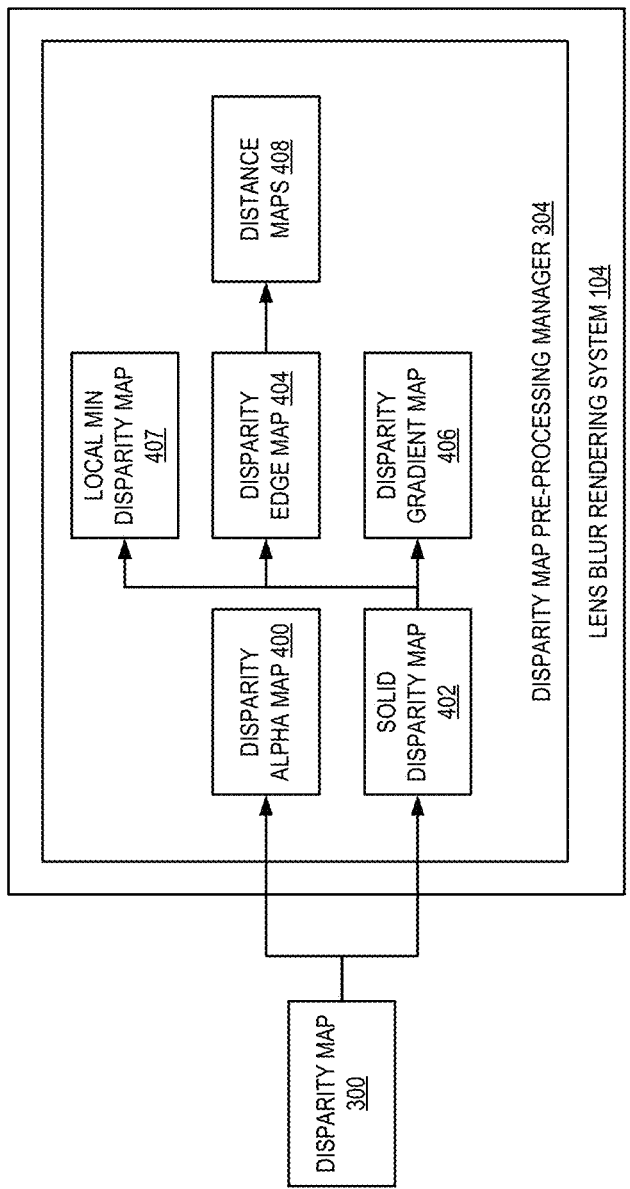
FIG. 4 illustrates a diagram of disparity map pre-processing in accordance with one or more embodiments.

FIG. 4 illustrates a diagram of disparity map pre-processing in accordance with one or more embodiments. As discussed, a disparity map 302 is received by disparity map pre-processing manager 304 of lens blur rendering system 104. Preprocessing the disparity map helps facilitate efficient kernel reshaping. As shown, the disparity map 302 is refined to maximize render quality, by separating it into a disparity alpha map 400 and a solid disparity map 402. Since the input disparity map 302 is in image format, it suffers from the inaccuracy due to subpixel projection. For example, the boundaries of an object depicted in an image occupy either all of a pixel or part of a pixel. If a boundary occupies only part of a pixel, then the disparity is blended between the object and the background. This leads to a large drop in disparity due to subpixel occupancy, instead of real solid geometric change. Dramatic changes are removed by referring to neighbor pixels around the boundary. For example, let d' be the updated disparity, d the original, and $d^b$ the nearby average background disparity, the corresponding alpha is found as $$\alpha^d = \frac{(d - d^b)}{(d' - d^b)}.$$

In some embodiments, a local min disparity map 407 is generated by applying a morphological min filter (which is of linear complexity to the max kernel size) to solid disparity map 402. This local min disparity map 407 is used to determine the nearby background disparity. Disparity alpha $\alpha^d$ acts as an influencing weighting factor latter in splatting. As such, this blended boundary is separated out into the disparity alpha map and the disparity drop due to subpixel occupancy is removed from the solid disparity map 402, such that the solid disparity map solely respects the geometric disparity of the object projected at a boundary pixel.

From the solid disparity map 402, the disparity gradient map 406 is calculated. The disparity gradient map 406 is calculated by taking the derivative of the solid disparity map. The edge disparity map is extract from the solid disparity map and the disparity gradient map. For example, in some embodiments, the disparity edge map 404 includes edge pixels from solid disparity map 402 which have a corresponding gradient value greater than a threshold. Using the disparity edge map 404, distance to edge maps 408 (also referred to herein as "distance maps") are calculated. In some embodiments, four distance maps 408 are computed: distance to right, distance to left, distance up, and distance down. Each distance map includes a value for each pixel that indicates a distance in the direction of that map to the nearest object edge. In some embodiments, in addition to those four directional distance maps, a Euclidean distance map is computed, evaluating the L2 distance from any pixel to its nearest disparity edge. The distance maps are used in kernel reshaping as discussed further herein. All the preprocessing steps takes O(n) complexity and only need to be performed once. In some embodiments, no change is required for refocusing or changing the shape or size of the aperture.

Figure 5:
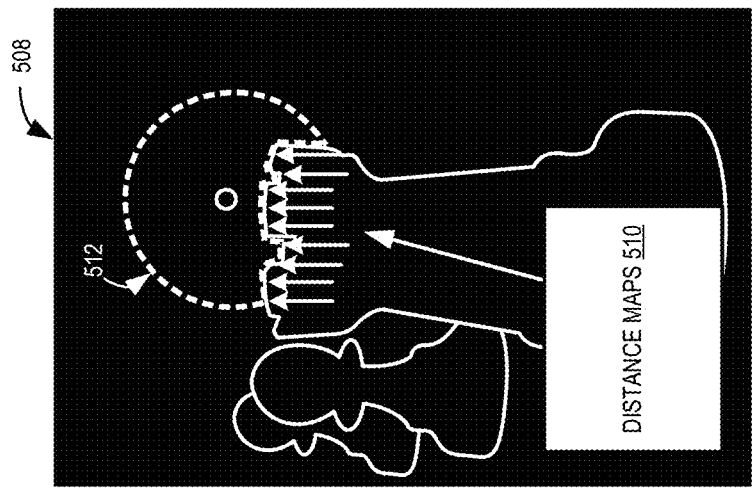
FIG. 5 illustrates an example of kernel reshaping in accordance with one or more embodiments.
Figure 5:
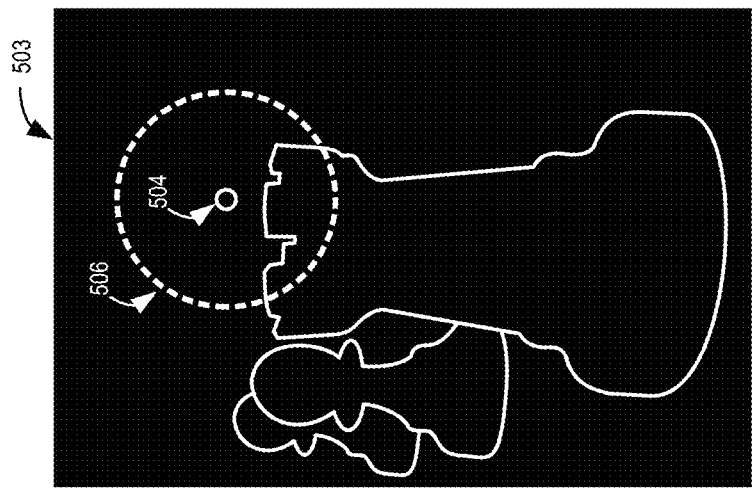
Figure 5:
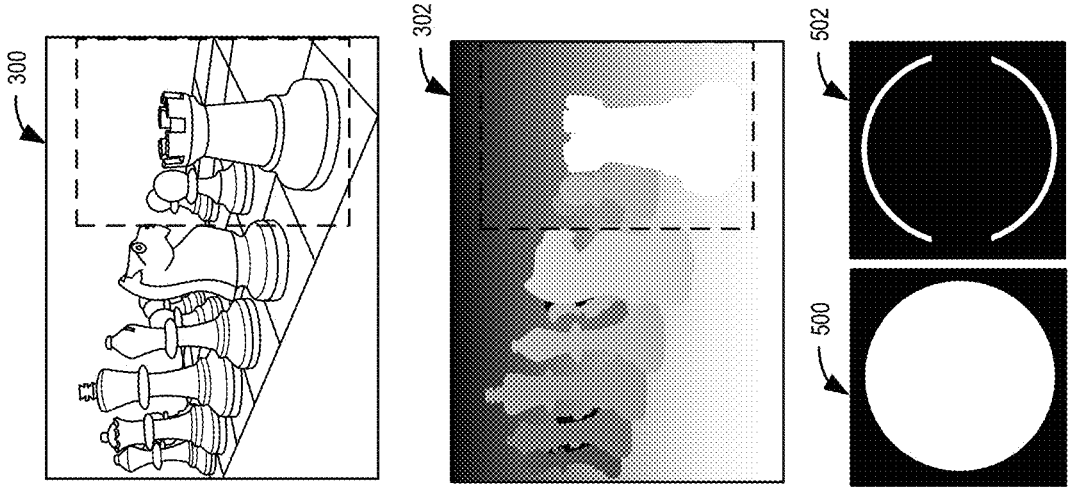

FIG. 5 illustrates an example of kernel reshaping in accordance with one or more embodiments. As discussed, the lens blur rendering system 104 receives an input image 300 and a corresponding disparity map 302. In the example of FIG. 5, it is assumed that the aperture shape is circular. Therefore, the blur kernel 500 is a disk and the gradient of the blur kernel 502 is the outline of the kernel 500. A given pixel splats its influence to its neighbor pixels. However, to ensure a realistic blur effect, the pixel should only splat influence to those neighboring pixels which are inside the influence range of the pixel. Kernel reshaping is used to ensure that each pixel only splats its influence to neighboring pixels inside its influence range. In some embodiments, kernel reshaping is performed for each splatting strategy by identifying qualified edges for that splatting strategy. One of the refined disparity maps, a disparity edge map 503, is used to reshape the kernel. For example, the blur kernel 506 for a particular point 504 in the input image is determined based on the relative disparity of that point to its desired focal depth/disparity. Other than keeping influence inside their actual influencing range to avoid color bleeding, kernel reshaping is further applied to strategically manipulate pixel influence and together leads to a per pixel linear system to solve for lens blur effect based on an alpha blending model. As discussed, a blur manager precomputes the blur kernels and makes them available during processing. As such, a new blur kernel is not computed on-demand during processing.

As shown in FIG. 5, the blur kernel 506 overlaps with the rook, indicating that at least a portion of the ray cone of the point 504 is occluded by the rook. As such, this edge of the rook is a qualified edge for occlusion condition, and the kernel is reshaped to exclude this region. Accordingly, kernel reshaping is performed to exclude any rays occluded by the blocking object (in this case the rook). As shown at 508, distance maps 510 are used to reshape the blur kernel to the edge of the blocking object. The distance maps indicate, for each pixel, a distance to a nearest edge in a particular direction. In some embodiments, the distance maps include an up distance map, a down distance map, a left distance map, and a right distance map, each indicating a distance to a nearest edge in the up, down, left, or right directions, respectively. In some embodiments, the distance maps also include a Euclidean distance map to the nearest edge. When splatting the kernel gradient along the vertical direction, only down and up distance maps are used to reshape the kernel according to an occlusion condition as shown at 512. All distance maps are used in occlusion test to determine whether a gradient point of the kernel, i.e. a boundary ray, is occluded. Once the reshaped kernel has been determined, the influences of the pixel 504 to its neighbor pixels are splatted accordingly for the blur effect. Additionally, since distance maps define the distance to the disparity edge, the move of each gradient point is instantaneous, there is no additional calculation needed. This occlusion test and gradient point moving continues until the boundary ray is considered as not occluded. The occlusion condition is the condition corresponding to the first color and count splatting strategies. For the second color and count splatting strategies, the strategy condition is that any disparity edge stops the influence regardless the pixel under splatting is on the side of an occluder or an occludee. Considering the disparity edge is sparse, the number of test and moving iterations is limited. Therefore, the reshaping complexity is $O(n \cdot r)$.

Figure 6:
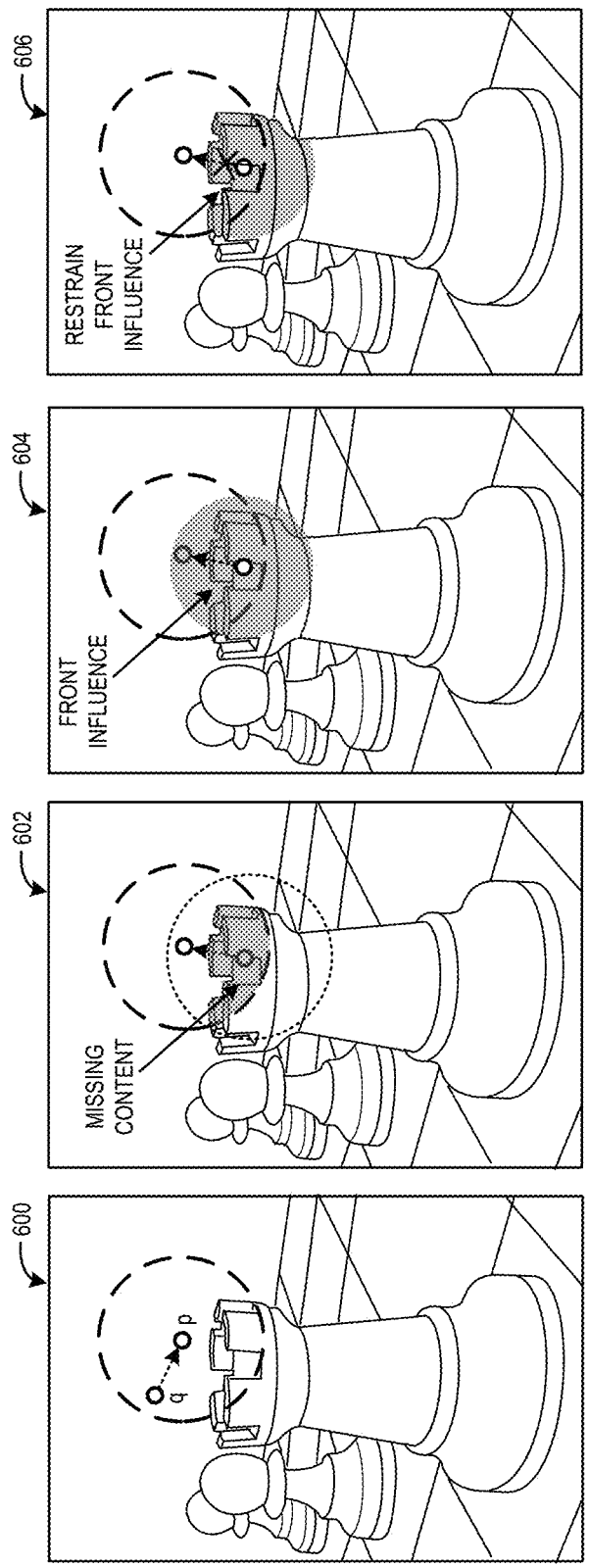
FIG. 6 illustrates an example of influence analysis in accordance with one or more embodiments.

FIG. 6 illustrates an example of influence analysis in accordance with one or more embodiments. In some embodiments, the final lens blur effect of a target pixel is based on the accumulated influence the target pixel gathers from its neighboring pixels. The neighboring pixels that influence a target pixel are those pixels whose blur kernel covers the target pixel. Therefore, the lens blur result is determined after all pixels have splatted their influences. The example shown in FIG. 6 illustrate possible influences a particular pixel, p, gathers from its neighboring pixels. As discussed, a particular pixel is influenced by its neighboring pixels and missing content that is occluded by an object. To efficiently check the occlusion condition, a piecewise linearly smooth surface is assumed. Under this assumption, the gradient, and the disparity of one surface pixel determines the corresponding piece of surface's analytic equation in the slope-intercept form. Based on the linear assumption, a ray cone is partially occluded if and only if the surface intersects the outmost rays of the ray cone. When doing gradient splatting, occlusion checking is only performed for kernel gradient points, since those gradient points are positioned at the same location as the outmost rays. The use of disparity distance maps ensures that one piece of the linear approximation stops at disparity edge.

As shown at 600, the influence of a target pixel p by neighboring pixels {q} is manipulated through kernel reshaping. An intermediate lens blur effect is rendered based on a system of linear equations constructed through a plurality of kernel reshaping strategies. A first equation represents the color influences splatted from pixels in front of the target pixel, regarded as foreground pixels, and the color influence of visible pixels around the same depth of the target pixel, regarded as background pixels. Note that the foreground and background pixel categorization is specific to each particular target pixel. The color influence of the foreground pixels is known, since that content is visible, as shown at 604. However, in a 3D scene, it is possible that a portion of the pixels around the same depth of the target pixel are occluded, hence is missing in the input image. Accordingly, there is missing content that is unaccounted for in the first equation, as shown at 602. A second equation represents the color influence of just the background pixels (the influence of the foreground pixels is restricted using a kernel reshaping strategy that stops influence from going beyond any disparity edges as shown at 606). Two additional equations corresponding to the color influence equations discussed above are used to represent the count influence. This count splatting is used to manipulate the amount of influence one pixel has on another. For example, the influence of a complete kernel of a pixel is normalized to 1 regardless of the kernel size. When all the pixels only splat the kernel, a target pixel collects the amount of how many pixels are influencing it. Combined with the corresponding reshaping strategies, this helps to reveal the relative amounts between foreground pixels and background pixels. By solving this system of equations, an intermediate blur effect for the target pixel is determined. This process is performed on each pixel of the input image to determine the blur effect applied to the output image.

Figure 7:
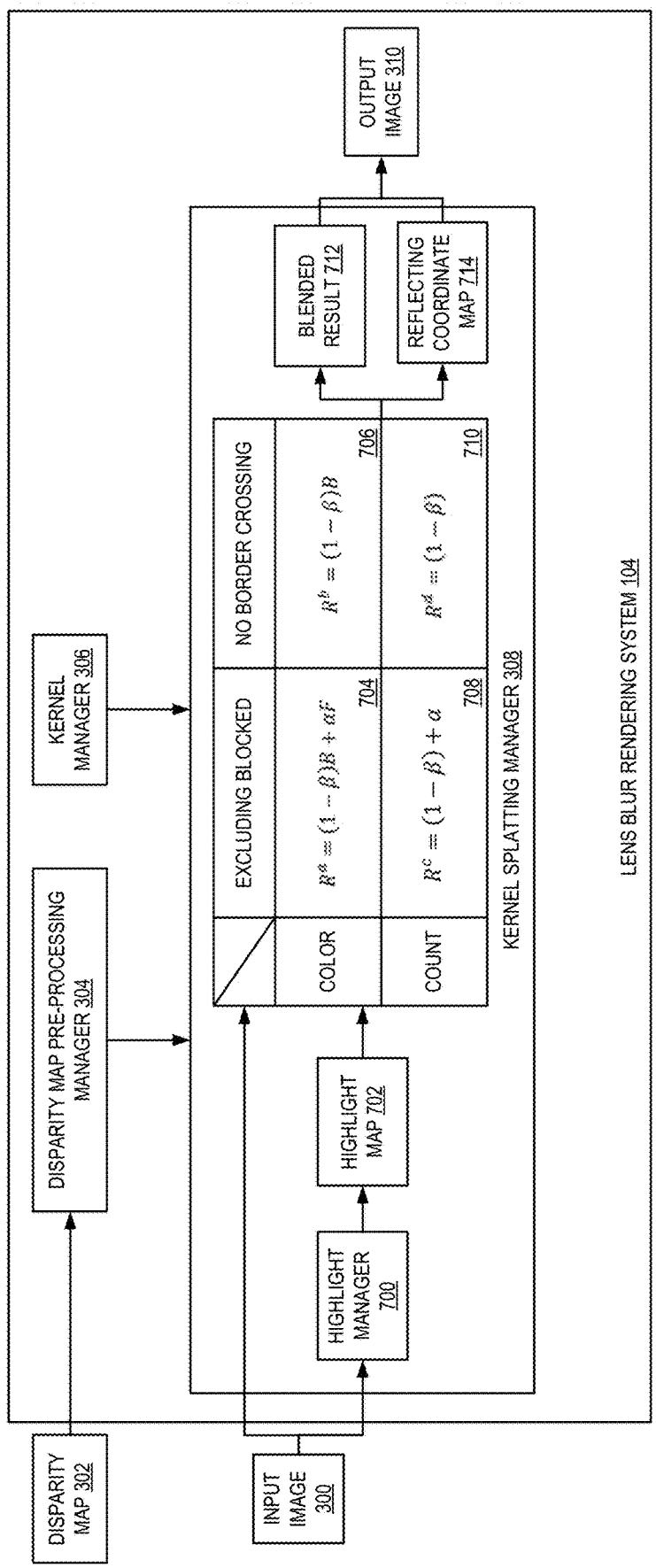
FIG. 7 illustrates a diagram of kernel reshaping powered splatting accordance with one or more embodiments.

FIG. 7 illustrates a diagram of kernel reshaping powered splatting accordance with one or more embodiments. As discussed, disparity map 302 is provided to disparity map pre-processing manager 304, to generate refined disparity maps, including a disparity alpha map, a solid disparity map, a disparity edge map, a disparity gradient map, and distance maps. These refined disparity maps and precomputed kernels by kernel manager 306 are provided to kernel splatting manager 308. As shown in FIG. 7, input image 300 is provided to kernel splatting manager 308. Additionally, a highlight manager 700 receives the input image 300 and generates a highlight map 702.

Highlight map 702 includes a highlight weight value for each pixel in the highlight map. Larger weights are assigned to simulate highlighted bokeh in the original input image color space. This preserves the original color tone of these highlights. Without actual raw data, the highlight manager 700 uses Laplacian pyramid to detect highlights as spots having relatively higher intensity compared to neighboring pixels. In some embodiments, alternative techniques are used to detect highlights, such as machine learning techniques. The highlight weight $w^h$ acts as a weighting factor in splatting by kernel splatting manager 308.

As shown in FIG. 7, kernel splatting manager 308 solves the system of linear equations discussed above to determine a lens blur effect for each pixel of the input image. The first equation represents the color influence splatted from all visible pixels by kernel reshaping strategy that only excludes occluded background pixels. As shown at 704, this equation is $R_p^\alpha = (1-\beta_p)B_p + \alpha_p F_p$, where $\beta_p$ is the missing portion of the background influence at the target pixel p, $\alpha_p$ is the amount of foreground influence, i.e. the transparency of blurred foreground objects, $F_p$ is the combined foreground color, and $B_p$ is the combined background color. Ideally, the lens blur result should be $R_p = (1-\alpha_p)B_p + \alpha_p F_p$. Compared to the first equation, the unblocked foreground color influence $\alpha_p F_p$ is entirely included in target $R_p^\alpha$ after splatting, while the background color influence is scaled according to the amount of visible background pixels (e.g., to account for the absent influence by the occluded pixels) instead of the foreground object transparency. In splatting operation, disparity alpha value $\alpha_q^d$, which indicates the occupancy of pixel q, is multiplied into the original splatting target $C_q = (c_q^r, c_q^g, c_q^b)$, the input color of pixel q, as $\alpha_q^d C_q$.

The second equation represents the color influence only by the background pixels through kernel reshaping strategy that restrains influence inside object boundaries. As shown at 706, this is $R_p^b = (1-\beta_p)B_p$. Additionally, the third equation represents the count influence on the target pixel through the same kernel reshaping strategy used to construct equation $R_p^\alpha$, but in the count space rather than the color space. As shown at 708, this is $R_p^c = (1-\beta_p) + \alpha_p$. Similarly, the fourth equation represents the count influence when the foreground count influence is restrained. As shown at 710, this is $R_p^d=(1-\beta_p)$. Similar to the first equation, the disparity alpha value is multiplied into all the original splatting targets involved in the other three equations. As an example, the count splatting operation splats $\alpha_q^d$. Accordingly, the system of four equations is associated with four unknowns $\alpha$, $\beta$, F, B. Solving the linear system results in a blended result 712 of $R_p'=(1-\alpha_p)B_p+\alpha_p F_p$ as an intermediate lens blur effect result. Although it corrects the blending weights due to occlusion, this intermediate lens blur result does not generate any missing content that is supposed to emerge through any blurred front objects according to the transparency $(1-\beta_p)$ in the inner half side of the blurred boundary.

The above analysis does not involve highlighted bokeh. When the highlight reweighting is involved, we use homogeneous color vector $\overline{C}_q=(c_q^r, c_q^g, c_q^b, 1.0)$ and splats $(\alpha_q^d w_q^h \overline{C}_q)$ to account for disparity alpha and highlight weight. The highlight weights are obtained using highlight map 702, as discussed above. Count splatting, as discussed above, remains the same. The last homogeneous element is used to normalize the scaled version of combined colors $F_p$ and $B_p$. With the last homogeneous element introduced, two extra equations $R_p^e=(1-\beta_p)w_p^B+\alpha_p w_p^F$ and $R_p^f=(1-\beta_p)w_p^B$ are brought into the linear system and the combined weights $w_p^F$ and $w_p^B$ are recovered to normalize the scaled version of $F_p$ and $B_p$ respectively.

In some embodiments, missing background content hallucination is minimized by only generating missing content for regions where missing content should emerge. This happens only in the inner half region of a translucent blurred object boundary, and where the originally occluded missing background content becomes visible. The regions that require hallucination are identified as those 1) whose background influence factor $\beta_p$ gathered is less than one and 2) which are located at the inner side of object boundaries. In such cases, the transparency of the current object layer is $(1-\beta_p)$. The second condition is determined as whether the region is near a disparity edge and at the occluder side of the disparity edge. This is checked efficiently with the help of the local min disparity map and the Euclidean distance map. Since the intermediate lens blur result $R_p'$ does not account for this, those pixels in such identified regions are deemed as currently unsettled, while other pixels are settled with correct lens blur effect. In some embodiments, various techniques are used to hallucinate the missing content, e.g. learning based inpainting. Note that any missing content should be correctly lens blurred before blending them with the foreground color by $\alpha_p$, or the lens blurred version of the missing content is directly generated for blending.

Alternatively, in some embodiments, the content of settled pixels from the opposite side of the boundary is used to hallucinate the missing content. Reflecting coordinate map 714 records the positions of the reflecting pixel around boundaries of objects. As shown in FIG. 7, the blended result 712 is combined with the content generated based on the reflecting coordinate map 714 according to the foreground transparency in identified emerging missing content regions to determine the output image 310.

Figure 8:
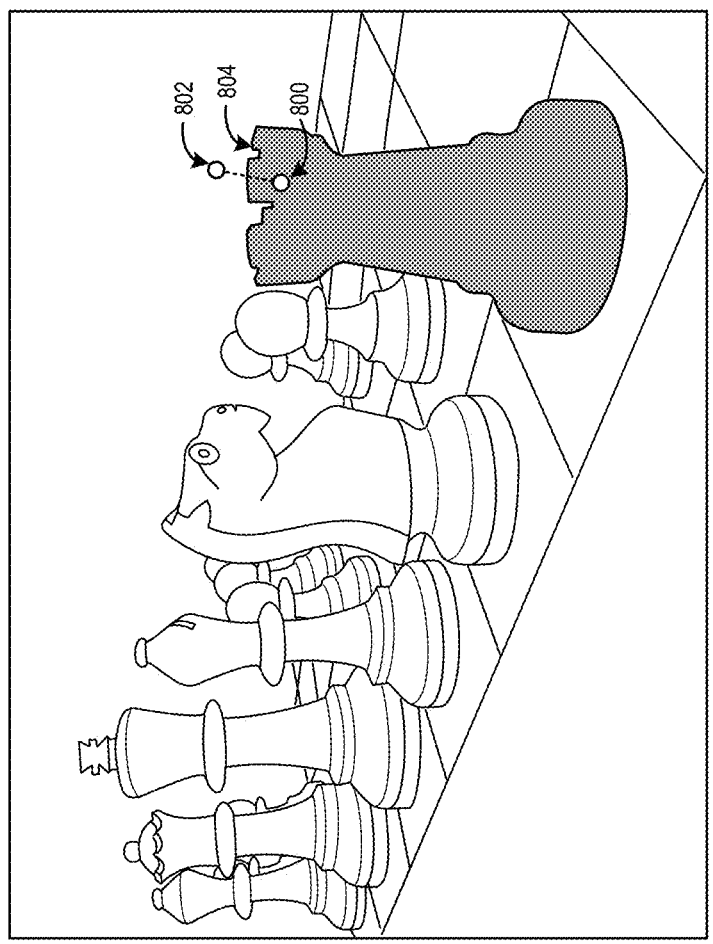
FIG. 8 illustrates an example of missing content synthesis, in accordance with an embodiment.

FIG. 8 illustrates an example of missing content synthesis, in accordance with an embodiment. As shown in FIG. 8, for missing content, such as point 800, a symmetric point 802 on the opposite side of the object boundary 804 is identified. In some embodiments, the reference position is determined by reflecting the track from the current pixel to the reflecting edge according to the Euclidean distance map. Since the opposite side could also have missing content which should be reflected according to its own defocused boundary, any reflections are iteratively traced until a settled pixel is identified, or until a predefined max iteration count is reached. All involved pixels along the track are blended together according to their transparency to produce the final result. The transition width of the blurred boundary from transparency 0 to 1 is at most 2r, and the reflecting location is at most 2r distance away. Therefore, the reflection localization takes O(nr). However, since the actual number of pixels needed to be hallucinated is typically much less than n, the running speed is much higher in practice.

Figure 9:
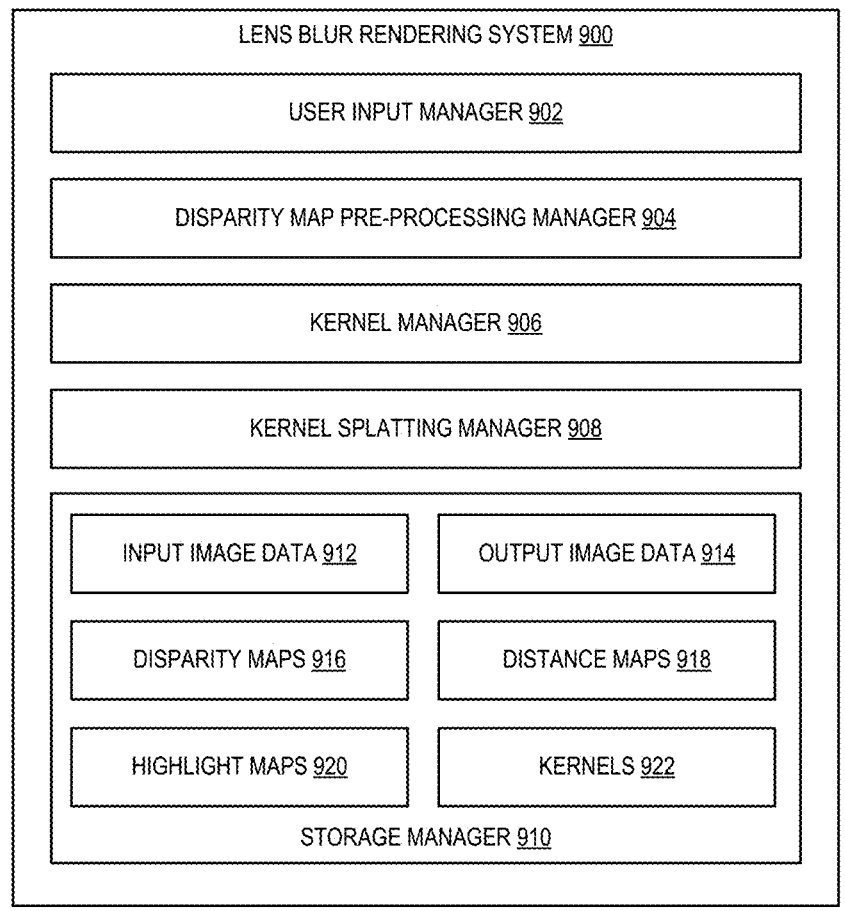
FIG. 9 illustrates a schematic diagram of a lens blur rendering system in accordance with one or more embodiments.

FIG. 9 illustrates a schematic diagram of a lens blur rendering system (e.g., "lens blur rendering system" described above) in accordance with one or more embodiments. As shown, the lens blur rendering system 900 is stored in memory as program code, data structures, etc. and includes, but is not limited to, a user input manager 902, a disparity map pre-processing manager 904, a kernel manager 906, a kernel splatting manager 908, and a storage manager 910. The storage manager 910 includes input image data 912, output image data 914, disparity maps 916, distance maps 918, highlight maps 920, and kernels 922.

The lens blur rendering system 900 includes a user input manager 902 that allows users to provide input to the lens blur rendering system 900. For example, the user input manager 902 allows users to select one or more images to which to add blur effects. In some embodiments, the user input manager 902 enables a user to select one or more images from images stored or accessible by storage manager 910. In some embodiments, the user input manager 902 enables a user to provide one or more images to the blur manager for processing. Additionally, the user input manager 902 allows users to blur parameters, such as an aperture shape, distance of interest, etc.

As illustrated in FIG. 9, the lens blur rendering system 900 also includes the disparity map pre-processing manager 904. As discussed, the disparity map pre-processing manager 904 receives the disparity map corresponding to the input image to which a blur effect is to be added. The disparity map pre-processing manager 904 generates a plurality of refined disparity maps and distance to edge (also referred to as "distance") maps based on the input disparity map. This pre-processing is performed once when the disparity map and input image are received, and are blur settings independent (e.g., do not have to be recomputed if the aperture shape or focal depth/disparity are changed). The refined disparity maps include a disparity alpha map, a solid disparity map, a disparity edge map, a disparity gradient map. As discussed, the solid disparity map makes subpixel object edges to fully occupy a pixel and removes the disparity drop due to subpixel occupancy. The subpixel occupancy is preserved in the disparity alpha map. The disparity edge map is computed by identifying the edges of objects in the solid disparity map using the disparity gradient map, which is computed by taking the derivative of the solid disparity map. The disparity map pre-processing manager 904 computes the distance maps using the disparity edge map. In some embodiments, the distance maps include four directional distance maps: distance to right, distance to left, distance up, and distance down. Each distance map includes a value for each pixel that indicates a distance in the direction of that map to the nearest disparity edge. In some embodiments, the distance maps also include a Euclidean distance map that indicates the Euclidean distance from any pixel to its nearest disparity edge.

As illustrated in FIG. 9, the lens blur rendering system 900 also includes the kernel manager 906. Kernel manager 906 precomputes kernel gradients to be used to compute the blur effect for an input image. As discussed, the blur effect is computed in the gradient space, therefore blur kernel gradients are precomputed. The kernel size varies depending on the disparity between the point and its desired focal depth/disparity, as such a set of blur kernels of different sizes are computed. The shape of the blur kernels depends on the shape of the aperture (e.g., a circular aperture results in disks, a six bladed aperture results in hexagonal kernels, etc.). For some effects (e.g. cat's eye bokeh), the shape of the blur kernel also depends on the spatial location of the sensor. Kernel gradients at different locations are also computed. The precomputed blur kernels are made available to the kernel splatting manager to compute the blur effect for an input image.

As illustrated in FIG. 9, the lens blur rendering system 900 also includes the kernel splatting manager 908. As discussed, the kernel splatting manager 908 is responsible for generating the blur effect for an input image. When an input image is received, the kernel splatting manager 908 computes a highlight map (e.g., using highlight manager 700, discussed above) which includes a highlight weight value for each pixel of the input image. These weights are used by the kernel splatting manager to simulate bokeh highlights in the blur effect. The highlight map and the input image are then used to compute the blur effect. As discussed, for each pixel of the input image, a blur kernel precomputed by the kernel manager is identified. The size of the blur kernel is dependent on the disparity of the pixel being processed relative to its desired focal depth/disparity. The blur kernel is reshaped strategically to manipulate pixel influences using the disparity edge map to construct a linear system. The blur effect is formulated as an alpha blending problem with an alpha, one combined foreground and one combined background color per pixel. An intermediate lens blur result is gained by solving this system of linear equations for the pixel being processed, as discussed above with respect at least to FIG. 7. In some embodiments, any missing content is hallucinated and combined with the intermediate blur result to determine the final blur effect for that pixel. The lens blurred missing content is hallucinated by reflecting the symmetrical area on the intermediate blur result along the original boundary of a front object. In some embodiments, machine learning is used to in-paint the hallucinated content. The output image is then stored using storage manager 910 and made available to the user.

As illustrated in FIG. 9, the lens blur rendering system 900 also includes a storage manager 910. The storage manager 910 maintains data for the lens blur rendering system 900. The storage manager 910 maintains data of any type, size, or kind as necessary to perform the functions of the lens blur rendering system 900. The storage manager 910, as shown in FIG. 9, includes the input image data 912. The input image data 912 includes one or more digital images, as discussed in additional detail above. In some embodiments, the input image data 912 includes one or more disparity maps corresponding to the one or more digital images, as discussed in detail above. As discussed, in some embodiments, the disparity map data is included as a channel of the corresponding input image. Alternatively, the disparity map is included as a separate file. Additionally, in various embodiments, the input image data includes any type of digital visual media, including digital images and/or digital videos. For example, input image data 912 includes at least one digital image provided by a user, where the user seeks to add lens blur effects to the digital image. In some embodiments, input image data 912 also includes information or data generated by the lens blur rendering system 900 regarding the input images. For instance, input image data 912 includes pixel identification, pixel labels, metadata, or other information regarding digital images utilized by the lens blur rendering system 900.

As further illustrated in FIG. 9, the storage manager 910 includes output image data 914. Output image data 914 includes one or more output digital images which have been processed by the lens blur rendering system 900 to add lens blur effects to the one or more input digital images. As discussed above, the lens blur rendering system processes an input image to add a lens blur effect to it, resulting in an output image. The output images are maintained by storage manager 910.

As further illustrated in FIG. 9, the storage manager 910 includes disparity maps 916 and distance maps 918. As discussed above, the disparity map pre-processing manager 904 generates a plurality of refined disparity maps 916 and distance maps 918 based on the input disparity map. These disparity maps 916 and distance maps 918 are stored by the storage manager until needed by the kernel splatting manager to compute the blur effect for an input image.

As further illustrated in FIG. 9, the storage manager 910 includes highlight maps 920. Highlight maps 920 are generated by a highlight manager of kernel splatting manager 908 and include a highlight weight value for each pixel in the highlight map. Larger weights are assigned to simulate highlighted bokeh in the original input image color space. This preserves the original color tone of these highlights. The highlight manager uses Laplacian pyramid to detect highlights as spots having relatively higher intensity compared to neighboring pixels. In some embodiments, alternative techniques are used to detect highlights, such as machine learning techniques.

As further illustrated in FIG. 9, the storage manager 910 includes kernels 922. Kernels 922, or "blur kernels" represent the shape that a target point in an input image is splatted to in the blur effect of an output image. The shape of the blur kernel is based on the shape of the aperture being simulated. The blur kernel sizes depend on the relative disparity shown in disparity map. Because convolution is performed in gradient space, kernel manager precomputes the gradient of the kernel. For example, the kernel of a circular aperture is a disk, and the gradient of the disk is the signed edges of the disk. Multiple sizes of kernels are precomputed for use as needed by the kernel splatting manager.

In some embodiments, the storage manager 910 manages various underlying storage devices coupled to the lens blur rendering system 900. The storage devices include one or more non-transitory computer readable storage media, such as a hard disk drive (HDD), flash memory, a Universal Serial Bus (USB) drive or a combination these or other storage devices. In some embodiments, the storage manager 910 manages storage of input and output image data in a remote storage service or system. For example, in some embodiments, the storage manager communicates over one or more public and/or private networks (e.g., the internet, a local area network, a storage area network, etc.) to a storage service that provides block storage, object storage, database storage, etc.

Embodiments have been described with respect to processing source images. In various embodiments, the techniques described above are applicable for processing input digital videos by applying the lens blur effect to each frame of the input digital video.

Each of the components 904-910 of the lens blur rendering system 900 and their corresponding elements (as shown in FIG. 9) are in communication with one another using any suitable communication technologies. It is recognized that although components 904-910 and their corresponding elements are shown to be separate in FIG. 9, in some embodiments, any of components 904-910 and their corresponding elements are combined into fewer components, such as into a single facility or module, divided into more components, or configured into different components depending on the needs of a particular embodiment.

The components 904-910 and their corresponding elements comprise software, hardware, or both. For example, the components 904-910 and their corresponding elements comprise one or more instructions stored on a computer-readable storage medium and executable by processors of one or more computing devices. When executed by the one or more processors, the computer-executable instructions of the lens blur rendering system 900 cause a client device and/or a server device to perform the methods described herein. Alternatively, the components 904-910 and their corresponding elements comprise hardware, such as a special purpose processing device to perform a certain function or group of functions. Additionally, the components 904-910 and their corresponding elements comprise a combination of computer-executable instructions and hardware.

Furthermore, the components 904-910 of the lens blur rendering system 900, in various embodiments, are implemented as one or more stand-alone applications, as one or more modules of an application, as one or more plug-ins, as one or more library functions or functions that are called by other applications, and/or as a cloud-computing model. Thus, the components 904-910 of the lens blur rendering system 900, in various embodiments, are implemented as a stand-alone application, such as a desktop or mobile application. Furthermore, the components 904-910 of the lens blur rendering system 900, in various embodiments, are implemented as one or more web-based applications hosted on a remote server. Alternatively, or additionally, the components of the lens blur rendering system 900, in various embodiments, are implemented in a suit of mobile device applications or "apps." To illustrate, the components of the lens blur rendering system 900, in various embodiments, is implemented in a digital image or video editing application, including but not limited to ADOBE® PHOTOSHOP® or ADOBE® PREMIERE® PRO. "ADOBE®," "ADOBE® PHOTOSHOP®," and "ADOBE® PREMIERE® PRO" are either registered trademarks or trademarks of Adobe Inc. in the United States and/or other countries.

Figure 10:
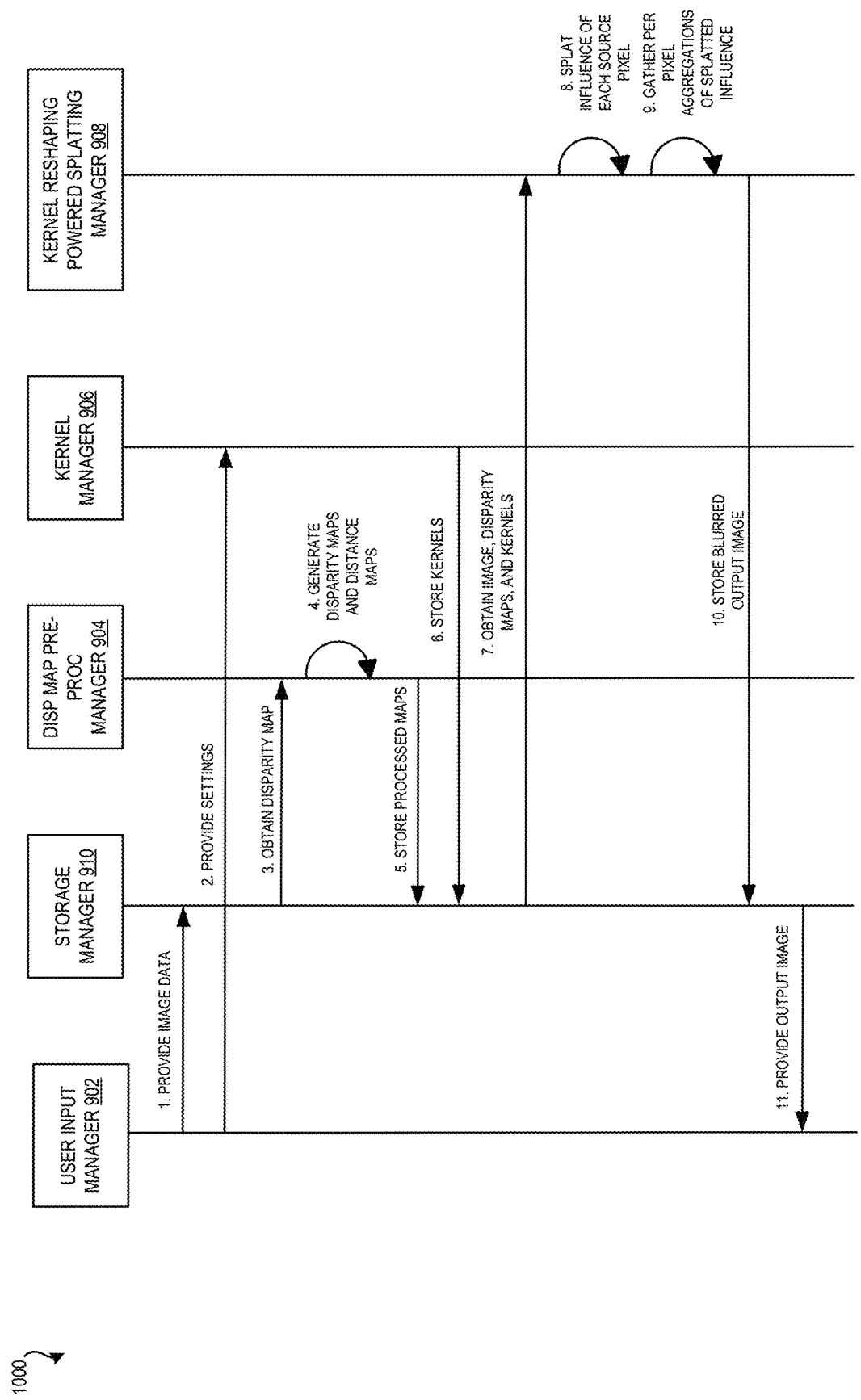
FIG. 10 illustrates a sequence diagram of a lens blur rendering system in accordance with one or more embodiments.

FIG. 10 illustrates a sequence diagram 1000 of a lens blur rendering system in accordance with one or more embodiments. As shown in FIG. 10, adding blur effects to an image starts at numeral 1 in which a user provides image data to the lens blur rendering system. For example, in FIG. 10, the user uploads the image to storage manager 910 which stores the image locally in the lens blur rendering system. In some embodiments, the user input manager 902 is a component of a design application which enables the user to select an image file corresponding to the image to be edited through a graphical user interface. In some embodiments, the image data includes the all in-focus image and a corresponding disparity map. The disparity map is provided, in some embodiments, as a channel of the input image. Alternatively, the disparity map is provided as a separate file. At numeral 2, the user provides blur settings to kernel manager 906 via user input manager 902. As discussed, the kernel settings include at least a distance of interest (e.g., corresponding to the focal depth/disparity) and an aperture shape.

At numeral 3, the disparity map pre-processing manager 904 obtains the disparity map for the input image from the image data provided by the user. In some embodiments, this includes extracting the disparity map from a channel of the input image. Alternatively, if a separate disparity map file has been provided, the disparity map pre-processing manager obtains the disparity map file. Once the disparity map pre-processing manager 904 obtains the disparity map, at numeral 4, the disparity map pre-processing manager 904 generates refined disparity maps and distance maps. For example, the refined disparity maps include a disparity alpha map, a solid disparity map, a disparity edge map, a disparity gradient map. As discussed, the solid disparity map makes subpixel object edges to fully occupy a pixel and removes the disparity drop due to subpixel occupancy. The subpixel occupancy is preserved in the disparity alpha map. The disparity edge map is computed by identifying the edges of objects in the solid disparity map using the disparity gradient map, which is computed by taking the derivative of the solid disparity map. The disparity map pre-processing manager 904 computes the distance maps using the disparity edge map. In some embodiments, the distance maps include four distance maps: distance to right, distance to left, distance up, and distance down. Each distance map includes a value for each pixel that indicates a distance in the direction of that map to the nearest disparity edge. In some embodiments, the distance maps also include a Euclidean distance map to the nearest disparity edge. At numeral 5, the disparity maps and the distance maps are stored using storage manager 910. At numeral 6, kernel manager 906 stores a plurality of kernel gradients of different shapes and sizes. As discussed, the shape of the kernel is based on the shape of the aperture and the size of the kernel is based on the disparity from the focal surface. As these factors are independent of the particular image to which the blur effect is to be applied, in some embodiments, the kernels are precomputed and stored to be made available to the kernel splatting manager 908 when needed.

At numeral 7, the input image, disparity maps, and kernel gradients are obtained by the kernel splatting manager 908. The kernel splatting manager 908 first splats the influence of each source pixel from the input image, at numeral 8. As discussed above, this splatting step involves several passes of kernel gradient reshaping for each pixel according to the aforementioned plurality of splatting strategies. At numeral 9, since the splatting is conducted in gradient domain, once all the color and count gradient influences of each pixel have been splatted according to the splatting strategies resulting in splatted gradient fields, the color and count per-pixel influences are gathered by integrating over the gradient fields, based on which a linear system of equations is constructed and solved for each pixel in the output image. In some embodiments, this results in an intermediate blur effect being determined. The final blur effect is then achieved through hallucinating missing content that has been revealed along the original boundary of a now-blurred front object. At numeral 10, the blurred output image is provided to the storage manager 910 to be stored. At numeral 11, the output image is then provided to the user via user input manager 902. For example, the output image is rendered in a graphical user interface of a digital design application executing on a computing device.

Figure 11:
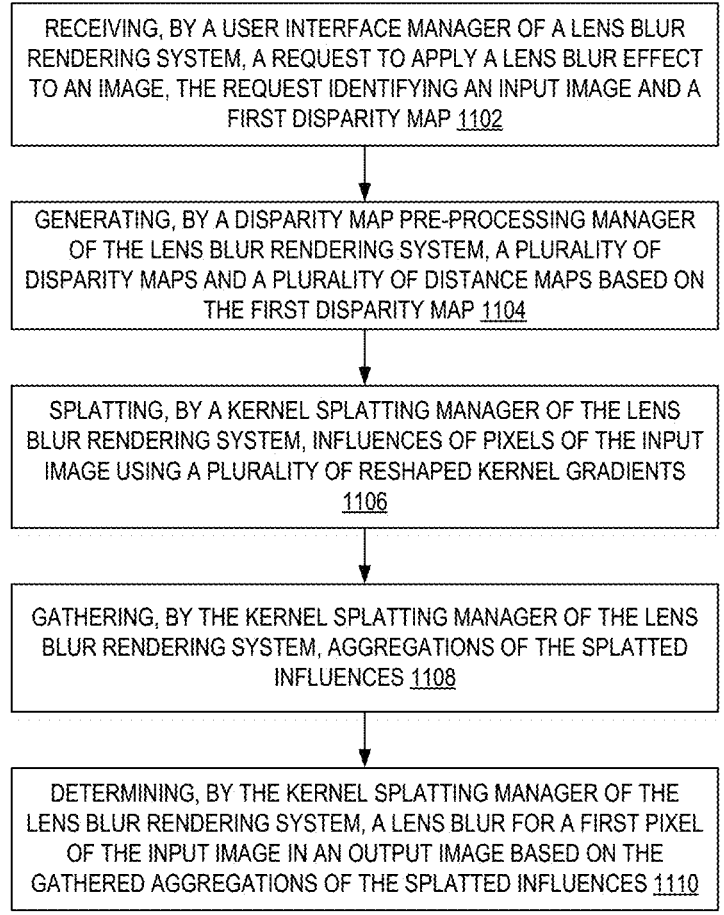
FIG. 11 illustrates a flowchart of a series of acts in a method of adding blur to an image in accordance with one or more embodiments.

FIGS. 1-10, the corresponding text, and the examples, provide a number of different systems and devices that allows a user to add lens blur to digital visual media. In addition to the foregoing, embodiments are also described in terms of flowcharts comprising acts and steps in a method for accomplishing a particular result. For example, FIG. 11 illustrates flowcharts of exemplary methods in accordance with one or more embodiments. The methods described in relation to FIG. 11, in various embodiments, are performed with less or more steps/acts or the steps/acts are performed in differing orders. Additionally, in some embodiments, the steps/acts described herein are repeated or performed in parallel with one another or in parallel with different instances of the same or similar steps/acts.

FIG. 11 illustrates a flowchart of a series of acts in a method of adding blur to an image in accordance with one or more embodiments. In one or more embodiments, the method 1100 is performed in a digital medium environment that includes the lens blur rendering system 900. The method 1100 is intended to be illustrative of one or more methods in accordance with the present disclosure and is not intended to limit potential embodiments. Alternative embodiments include additional, fewer, or different steps than those articulated in FIG. 11.

As illustrated in FIG. 11, the method 1100 includes an act 1102 of receiving, by a user interface manager of a lens blur rendering system, a request to apply a lens blur effect to an image, the request identifying an input image and a first disparity map. As discussed, in some embodiments, the request is received using user input manager 902 described above. For example, the request is made through a graphical user interface of lens blur rendering system 900, e.g., through selection of a graphical user interface element corresponding to lens blur and providing an input image and lens blur parameters. As discussed, in some embodiments, the disparity map is provided as a channel of the input image or is a separate file. In some embodiments, the lens blur parameters include a selection of a focal plane in the input image and aperture shape. In some embodiments, some or all of the blur parameters are set to a default value if no value is specified by the user.

As shown in FIG. 11, the method 1100 also includes an act 1104 of generating, by a disparity map pre-processing manager of the lens blur rendering system, a plurality of disparity maps and a plurality of distance maps based on the first disparity map. As discussed, in some embodiments, the disparity map pre-processing manager generates a disparity alpha map and a solid disparity map from the first disparity map. As discussed, the solid disparity map makes subpixel object edges to fully occupy a pixel and removes the disparity drop due to subpixel occupancy. The subpixel occupancy is preserved in the disparity alpha map. Additionally, disparity map pre-processing manager generates a gradient disparity map, a disparity edge map, and a local min disparity map based on the solid disparity map. The gradient disparity map is generated by computing the derivative of the solid disparity map. Using the gradient disparity map and the solid disparity map, the disparity edge map is generated which includes object edges depicted in the disparity map.

In some embodiments, the disparity map pre-processing manager generates the plurality of distance maps, including directional distance maps and a Euclidean distance map, using the disparity edge map. Each pixel of a directional distance map indicates a distance to a nearest edge in direction associated with the distance map and each pixel of the Euclidean distance map indicates a Euclidean distance to a nearest edge. As discussed, in some embodiments, the directional distance maps include an up distance map, a down distance map, a left distance map, and a right distance map.

In some embodiments, the method 1100 also includes an act of generating, by a kernel manager of the lens blur rendering system, a plurality of kernel gradients corresponding to kernels of different shapes and sizes. As discussed, in some embodiments, different kernel sizes are used depending on the relative disparity of the target pixel from the focal surface. As such, the kernel manager precomputes a plurality of kernel gradients of different sizes to be used in computing the lens blur effect for the input image. Additionally, different shaped kernels are computed based on the different aperture shapes that are supported.

Furthermore, as illustrated in FIG. 11, the method 1100 also includes an act 1106 of splatting, by a kernel splatting manager of the lens blur rendering system, influences of pixels of the input image using a plurality of reshaped kernel gradients. The original kernel gradient, before reshaping, is selected based on the relative disparity of the pixel being processed. As discussed, using an unmodified, full kernel gradient suggests that the entire ray cone of the target pixel reaches the sensor of the camera. However, in real scenes, there are objects that exist between the point represented by the target pixel and the camera. By reshaping the kernel to exclude these blocking objects, artifacts such as color bleed are reduced or eliminated. More reshaping strategies are applied in order to construct a lens blur linear equation system. To reshape the kernel, the distance maps computed above are used to identify the closest edge to a point on the kernel gradient. If the closest edge is within the kernel and the corresponding reshaping strategy condition is met, then the boundary of the kernel gradient is moved to just beyond the edge using the distance indicated in the distance maps. This condition testing and gradient point moving continues until there is no qualified edge. If there is no edge within the kernel gradient, then no kernel reshaping is needed.

Furthermore, as illustrated in FIG. 11, the method 1100 also includes an act 1112 of gathering, by the kernel splatting manager of the lens blur rendering system, aggregations of the splatted influences. For example, the kernel splatting manager splats the color and count influences in gradient domain for all pixels in the input image and gathers the aggregated influences for all output pixels including the first pixel by integrating over the entire gradient fields. As discussed, color splatting and count splatting are involved in the splatting act. For example, the kernel splatting manager performs acts of determining a first color splatting influence excluding occluded content, determining a second color splatting influence that restrains the influence inside object boundaries, determining a first count splatting influence excluding occluded content, determining a second count splatting influence that restrains the influence inside object boundaries. The kernel splatting manager splats the per pixel four groups of gradient influences for all pixels and gathers the aggregated influences for all pixels by integrating over the entire resulting gradient fields. The influence aggregations are used to form the per pixel linear equation system based on an alpha blending model to determine the blur result for each pixel of the input image.

Furthermore, as illustrated in FIG. 11, the method 1100 also includes an act 1114 of determining, by the kernel splatting manager of the lens blur rendering system, a lens blur for a first pixel of the input image in an output image based on a linear equation system constructed from the gathered aggregations of the splatted influences using correspondingly reshaped kernel gradients and the plurality of disparity maps. The per pixel linear equation system is based on an alpha blending model that models the lens blur effect as a blended result from a single combined foreground color and a single combined background color. Once the parameters of this per pixel alpha blending model, i.e. the blending factor, the single foreground color and the single background color, are recovered by solving this linear equation system, they are used to reconstruct an intermediate blended result as discussed above. In some embodiments, the final lens blur effect is achieved by adding hallucinated content around the edges of blocking objects in the image, where the hallucinated content is generated by symmetrically reflecting content around the boundary of the corresponding object. In some embodiments, to complete the determination of the blur effect for an entire input image, the method 1100 further includes determining, by the kernel splatting manager, the lens blur for each pixel of the input image in the output image based on the plurality of aggregations of the splatted influences using correspondingly reshaped kernel gradients and the plurality of disparity maps.

In some embodiments, the method 1100 further includes generating, by a highlight manager, a highlight map of the input image, the highlight map including a highlight weight for each pixel of the input image indicating that pixel's relative intensity in the input image. The highlight map is used to simulate the effects of high intensity points of light resulting in brighter bokeh in the blurred image. By adding a higher weight to higher intensity pixels, the underlying color of the high intensity light source is preserved.

Figure 12:
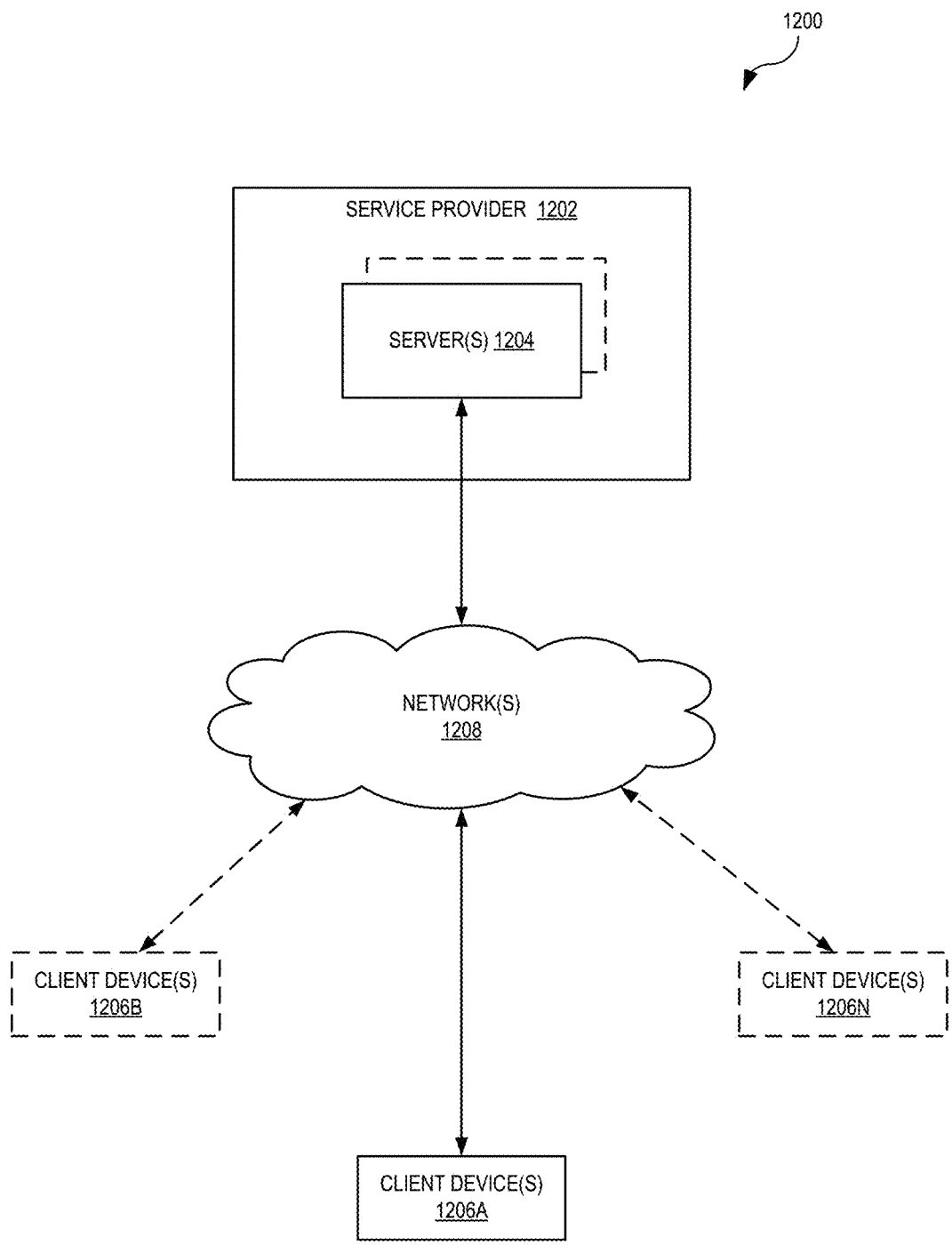
FIG. 12 illustrates a schematic diagram of an exemplary environment in which the lens blur rendering system operates in accordance with one or more embodiments.

FIG. 12 illustrates a schematic diagram of an exemplary environment 1200 in which the lens blur rendering system 1002 operates in accordance with one or more embodiments. In one or more embodiments, the environment 1200 includes a service provider 1202 which includes one or more servers 1204 connected to a plurality of client devices 1206A-1206N via one or more networks 1208. The client devices 1206A-1206N, the one or more networks 1208, the service provider 1202, and the one or more servers 1204 communicate with each other or other components using any communication platforms and technologies suitable for transporting data and/or communication signals, including any known communication technologies, devices, media, and protocols supportive of remote data communications, examples of which are described in more detail below with respect to FIG. 13.

Although FIG. 12 illustrates a particular arrangement of the client devices 1206A-1206N, the one or more networks 1208, the service provider 1202, and the one or more servers 1204, various additional arrangements are possible. For example, the client devices 1206A-1206N directly communicate with the one or more servers 1204, bypassing the network 1208. Or alternatively, the client devices 1206A-1206N directly communicate with each other. The service provider 1202, ins some embodiments, is a public cloud service provider which owns and operates their own infrastructure in one or more data centers and provides this infrastructure to customers and end users on demand to host applications on the one or more servers 1204. The servers include one or more hardware servers (e.g., hosts), each with its own computing resources (e.g., processors, memory, disk space, networking bandwidth, etc.) which are securely divided between multiple customers, each of which host their own applications on the one or more servers 1204. In some embodiments, the service provider is a private cloud provider which maintains cloud infrastructure for a single organization. The one or more servers 1204 similarly include one or more hardware servers, each with its own computing resources, which are divided among applications hosted by the one or more servers for use by members of the organization or their customers.

Similarly, although the environment 1200 of FIG. 12 is depicted as having various components, in various embodiments, the environment 1200 has additional or alternative components. For example, in some embodiments, the environment 1200 is implemented on a single computing device with the lens blur rendering system 1002. In particular, the lens blur rendering system 1002 is implemented in whole or in part on the client device 1202A. Alternatively, in some embodiments, the environment 1200 is implemented in a distributed architecture across multiple computing devices.

As illustrated in FIG. 12, the environment 1200 include client devices 1206A-1206N. The client devices 1206A-1206N comprise any computing device. For example, client devices 1206A-1206N comprise one or more personal computers, laptop computers, mobile devices, mobile phones, tablets, special purpose computers, TVs, or other computing devices, including computing devices described below with regard to FIG. 13. Although three client devices are shown in FIG. 12, it is appreciated that client devices 1206A-1206N comprise any number of client devices (greater or smaller than shown).

Moreover, as illustrated in FIG. 12, the client devices 1206A-1206N and the one or more servers 1204 communicate via one or more networks 1208. The one or more networks 1208 represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1208 are any suitable network over which the client devices 1206A-1206N access service provider 1202 and server 1204, or vice versa. The one or more networks 1208 are discussed in more detail below with regard to FIG. 13.

In addition, the environment 1200 also includes one or more servers 1204. The one or more servers 1204 generate, store, receive, and transmit any type of data, including input image data 1012, output image data 1014, or other information. For example, a server 1204 receives data from a client device, such as the client device 1206A, and send the data to another client device, such as the client device 1202B and/or 1202N. The server 1204 also transmits electronic messages between one or more users of the environment 1200. In one example embodiment, the server 1204 is a data server. The server 1204 also comprises a communication server or a web-hosting server. Additional details regarding the server 1204 are discussed below with respect to FIG. 13.

As mentioned, in one or more embodiments, the one or more servers 1204 includes or implement at least a portion of the lens blur rendering system 1002. In particular, the lens blur rendering system 1002 comprises an application running on the one or more servers 1204 or, in some embodiments, a portion of the lens blur rendering system 1002 is downloaded from the one or more servers 1204. For example, the lens blur rendering system 1002 includes a web hosting application that allows the client devices 1206A-1206N to interact with content hosted at the one or more servers 1204. To illustrate, in one or more embodiments of the environment 1200, one or more client devices 1206A-1206N accesses a webpage supported by the one or more servers 1204. In particular, the client device 1206A runs a web application (e.g., a web browser) to allow a user to access, view, and/or interact with a webpage or website hosted at the one or more servers 1204.

Upon the client device 1206A accessing a webpage or other web application hosted at the one or more servers 1204, in one or more embodiments, the one or more servers 1204 provides access to one or more digital images (e.g., the input image data 1012, such as camera roll or an individual's personal photos) stored at the one or more servers 1204. Moreover, the client device 1206A receives a request (i.e., via user input) to add a lens blur effect to one or more of the digital images and provide the request to the one or more servers 1204. Upon receiving the request, the one or more servers 1204 automatically performs the methods and processes described above to generate the lens blur affect for the one or more digital images. The one or more servers 1204 provide output image data, including one or more output digital images to which the lens blur effect has been applied to the client device 1206A for display to the user. Moreover, the user interacts with the client device 1206A indicating any changes to be made to the lens blur effect (e.g., changed aperture shape, distance of interest, etc.).

As just described, in some embodiments, the lens blur rendering system 1002 is implemented in whole, or in part, by the individual elements 1202-1208 of the environment 1200. It is appreciated that although certain components of the lens blur rendering system 1002 are described in the previous examples with regard to particular elements of the environment 1200, various alternative implementations are possible. For instance, in one or more embodiments, the lens blur rendering system 1002 is implemented on any of the client devices 1206A-N. Similarly, in one or more embodiments, the lens blur rendering system 1002 is implemented on the one or more servers 1204. Moreover, different components and functions of the lens blur rendering system 1002 are implemented separately among client devices 1206A-1206N, the one or more servers 1204, and the network 1208.

Embodiments of the present disclosure comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein are implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media includes any available media that is accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which is used to store desired program code means in the form of computer-executable instructions or data structures and which is accessible by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media include a network and/or data links which is used to carry desired program code means in the form of computer-executable instructions or data structures and which is accessed by a general purpose or special purpose computer. Combinations of the above are also included within the scope of computer-readable media.

Further, upon reaching various computer system components, program code means in the form of computer-executable instructions or data structures are transferred automatically from transmission media to non-transitory computer-readable storage media (devices) (or vice versa). For example, computer-executable instructions or data structures received over a network or data link are buffered in RAM within a network interface module (e.g., a "NIC"), and then eventually transferred to computer system RAM and/or to less volatile computer storage media (devices) at a computer system. Thus, it is intended to be understood that non-transitory computer-readable storage media (devices) are included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art appreciate that embodiments of the disclosure are practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure are practiced in distributed system environments where local and remote computer systems, which are linked (either by hardwired data links, wireless data links, or by a combination of hardwired and wireless data links) through a network, both perform tasks. In a distributed system environment, program modules are located in both local and remote memory storage devices.

Some embodiments of the present disclosure are implemented in cloud computing environments. In this description, "cloud computing" is defined as a model for enabling on-demand network access to a shared pool of configurable computing resources. For example, cloud computing is employed in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model is comprised of various characteristics such as, for example, on-demand self-service, broad network access, resource pooling, rapid elasticity, measured service, and so forth. A cloud-computing model also exposes various service models, such as, for example, Software as a Service ("SaaS"), Platform as a Service ("PaaS"), and Infrastructure as a Service ("IaaS"). In some embodiments, a cloud-computing model is deployed using different deployment models such as private cloud, community cloud, public cloud, hybrid cloud, and so forth. In this description and in the claims, a "cloud-computing environment" is an environment in which cloud computing is employed.

Figure 13:
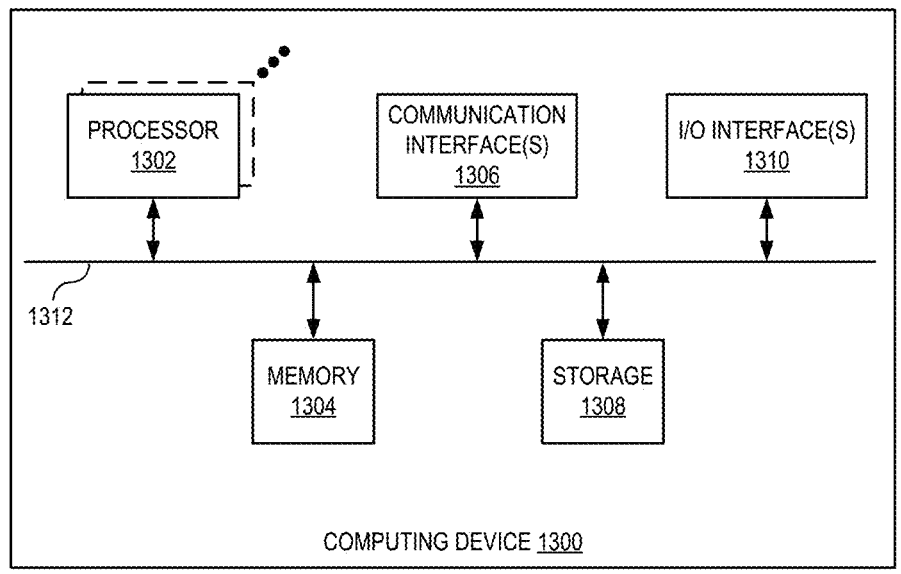
FIG. 13 illustrates a block diagram of an exemplary computing device in accordance with one or more embodiments.

FIG. 13 illustrates, in block diagram form, an exemplary computing device 1300 that is configured to perform one or more of the processes described above. One appreciates that one or more computing devices, such as the computing device 1300, implement the lens blur rendering system. As shown by FIG. 13, the computing device comprises a processor 1302, memory 1304, one or more communication interfaces 1306, a storage device 1308, and one or more I/O devices/interfaces 1310. In certain embodiments, the computing device 1300 includes fewer or more components than those shown in FIG. 13. Components of computing device 1300 shown in FIG. 13 is described in additional detail below.

In particular embodiments, processor(s) 1302 includes hardware for executing instructions, such as those making up a computer program. As an example, and not by way of limitation, to execute instructions, processor(s) 1302 retrieves (or fetches) the instructions from an internal register, an internal cache, memory 1304, or a storage device 1308 and decode and execute them. In various embodiments, the processor(s) 1302 includes one or more central processing units (CPUs), graphics processing units (GPUs), field programmable gate arrays (FPGAs), systems on chip (SoC), or other processor(s) or combinations of processors.

The computing device 1300 includes memory 1304, which is coupled to the processor(s) 1302. The memory 1304 is used for storing data, metadata, and programs for execution by the processor(s). The memory 1304 includes one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1304 is internal or distributed memory.

The computing device 1300 further includes one or more communication interfaces 1306. In various embodiments, a communication interface 1306 includes hardware, software, or both. The communication interface 1306 provides one or more interfaces for communication (such as, for example, packet-based communication) between the computing device and one or more other computing devices 1300 or one or more networks. As an example and not by way of limitation, communication interface 1306 includes a network interface controller (NIC) or network adapter for communicating with an Ethernet or other wire-based network or a wireless NIC (WNIC) or wireless adapter for communicating with a wireless network, such as a WI-FI. The computing device 1300 further includes a bus 1312. The bus 1312 comprises hardware, software, or both that couples components of computing device 1300 to each other.

The computing device 1300 includes a storage device 1308 includes storage for storing data or instructions. As an example, and not by way of limitation, storage device 1308 comprises a non-transitory storage medium described above. The storage device 1308 includes a hard disk drive (HDD), flash memory, a Universal Serial Bus (USB) drive or a combination these or other storage devices.

The computing device 1300 also includes one or more input or output ("I/O") devices/interfaces 1310, which are provided to allow a user to provide input to (such as user strokes), receive output from, and otherwise transfer data to and from the computing device 1300. These I/O devices/interfaces 1310 includes a mouse, keypad or a keyboard, a touch screen, camera, optical scanner, network interface, modem, other known I/O devices or a combination of such I/O devices/interfaces 1310. The touch screen is activated with a stylus or a finger.

The I/O devices/interfaces 1310 includes one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1310 is configured to provide graphical data to a display for presentation to a user. The graphical data is representative of one or more graphical user interfaces and/or any other graphical content as serves a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments take other specific forms without departing from its spirit or essential characteristics as understood by one of ordinary skill in the art. The described embodiments are to be considered in all respects only as illustrative and not restrictive. For example, in some embodiments the methods described herein are performed with less or more steps/acts or the steps/acts are performed in differing orders. Additionally, the steps/acts described herein are repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor is it to be understood to, imply that a given embodiment requires at least one of A, at least one of B, or at least one of C to each be present.

We claim:

1. A computer-implemented method comprising:
receiving, by a user interface manager of a lens blur rendering system, a request to apply a lens blur effect to an input image;

obtaining, by a kernel splatting manager of the lens blur rendering system, a plurality of disparity maps associated with the input image;

aggregating, by the kernel splatting manager, influences of pixels of the input image using a plurality of reshaped kernel gradients, the plurality of reshaped kernel gradients determined based on the plurality of disparity maps; and determining, by the kernel splatting manager, a lens blur for at least one pixel of the input image in an output image based on the aggregated influences.

2. The computer-implemented method of claim 1, wherein the request to apply the lens blur effect to the input image includes a first disparity map.

3. The computer-implemented method of claim 2, wherein the plurality of disparity maps includes a disparity alpha map and a solid disparity map, each based on the first disparity map, and a gradient disparity map, a disparity edge map, and a local min disparity map, each based on the solid disparity map.

4. The computer-implemented method of claim 1, wherein aggregating, by the kernel splatting manager, influences of pixels of the input image using a plurality of reshaped kernel gradients, the plurality of reshaped kernel gradients determined based on the plurality of disparity maps, further comprises:
splatting the influences using the plurality of reshaped kernel gradients; and
gathering the splatted influences.

5. The computer-implemented method of claim 1, wherein determining, by the kernel splatting manager of the lens blur rendering system, a lens blur for at least one pixel of the input image in an output image based on the aggregated influences, further comprises:
determining a first color splatting influence excluding occluded content;
determining a second color splatting influence that restrains the influence inside object boundaries;
determining a first count splatting influence excluding occluded content; and
determining a second count splatting influence that restrains the influence inside object boundaries.

6. The computer-implemented method of claim 1, further comprising:
generating, by the kernel splatting manager, a plurality of distance maps based on the plurality of disparity maps including directional distance maps and a Euclidean distance map.

7. The computer-implemented method of claim 6, further comprising:
generating, by the kernel splatting manager, the reshaped kernel gradients using the plurality of distance maps.

8. The computer-implemented method of claim 1, further comprising:
adding highlights to the lens blur based on a highlight map, wherein the highlight map indicates a highlight weight for each pixel of the input image indicating that pixel's relative intensity in the input image.

9. A system comprising:
a computing device implementing a lens blur rendering system, the lens blur rendering system comprising:
a user interface manager receive a request to apply a lens blur effect to an input image; and
a kernel splatting manager to:
obtain a plurality of disparity maps associated with the input image;
aggregate influences of pixels of the input image using a plurality of reshaped kernel gradients, the plurality of reshaped kernel gradients determined based on the plurality of disparity maps; and
determine a lens blur for at least one pixel of the input image in an output image based on the aggregated influences.

10. The system of claim 9, wherein the request to apply the lens blur effect to the input image includes a first disparity map.

11. The system of claim 10, wherein the plurality of disparity maps includes a disparity alpha map and a solid disparity map, each based on the first disparity map, and a gradient disparity map, a disparity edge map, and a local min disparity map, each based on the solid disparity map.

12. The system of claim 9, wherein to aggregate influences of pixels of the input image using a plurality of reshaped kernel gradients, the plurality of reshaped kernel gradients determined based on the plurality of disparity maps, the kernel splatting manager is further to:
splat the influences using the plurality of reshaped kernel gradients; and
gather the splatted influences.

13. The system of claim 9, wherein to determine a lens blur for at least one pixel of the input image in an output image based on the aggregated influences, the kernel splatting manager is further to:
determine a first color splatting influence excluding occluded content;
determine a second color splatting influence that restrains the influence inside object boundaries;
determine a first count splatting influence excluding occluded content; and
determine a second count splatting influence that restrains the influence inside object boundaries.

14. The system of claim 9, wherein the kernel splatting manager is further to:
generate a plurality of distance maps based on the plurality of disparity maps including directional distance maps and a Euclidean distance map.

15. The system of claim 14, wherein the kernel splatting manager is further to:
generate the reshaped kernel gradients using the plurality of distance maps.

16. The system of claim 9, further comprising:
a highlight manager to add highlights to the lens blur based on a highlight map, wherein the highlight map indicates a highlight weight for each pixel of the input image indicating that pixel's relative intensity in the input image.

17. A system comprising:
means for receiving a request to apply a lens blur effect to an input image;
means for obtaining a plurality of disparity maps associated with the input image;
means for aggregating influences of pixels of the input image using a plurality of reshaped kernel gradients, the plurality of reshaped kernel gradients determined based on the plurality of disparity maps; and
means for determining a lens blur for at least one pixel of the input image in an output image based on the aggregated influences.

18. The system of claim 17, wherein the request to apply the lens blur effect to the input image includes a first disparity map.

19. The system of claim 18, wherein the plurality of disparity maps includes a disparity alpha map and a solid disparity map, each based on the first disparity map, and a gradient disparity map, a disparity edge map, and a local min disparity map, each based on the solid disparity map.

20. The system of claim 17, wherein the means for aggregating influences of pixels of the input image using a plurality of reshaped kernel gradients, the plurality of reshaped kernel gradients determined based on the plurality of disparity maps, further comprises:
- means for splatting the influences using the plurality of reshaped kernel gradients; and
- means for gathering the splatted influences.

* * * * *